US012658695B2

(12) United States Patent
Do et al.

(10) Patent No.: US 12,658,695 B2
(45) Date of Patent: Jun. 16, 2026

(54) DEVICE FOR ELECTROSTATIC DISCHARGE PROTECTION USING SILICON CONTROLLED RECTIFIER

(71) Applicant: SAMSUNG ELECTRONICS CO., LTD., Suwon-si (KR)

(72) Inventors: Kyoungil Do, Suwon-si (KR); Jinwoo Jung, Suwon-si (KR); Jooyoung Song, Suwon-si (KR); Mijin Lee, Suwon-si (KR); Chanhee Jeon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 95 days.

(21) Appl. No.: 18/402,453

(22) Filed: Jan. 2, 2024

(65) Prior Publication Data

US 2024/0222963 A1     Jul. 4, 2024

(30) Foreign Application Priority Data

Jan. 2, 2023    (KR) ........................ 10-2023-0000367

(51) Int. Cl.
*H02H 9/04*          (2006.01)
(52) U.S. Cl.
CPC .................................. *H02H 9/045* (2013.01)
(58) Field of Classification Search
CPC ...... H02H 9/045; H02M 1/32; H02M 7/1557; H10D 18/251; H10D 89/60; H10D 89/611; H10D 89/711; H10D 89/713; H10D 89/911; H10D 89/931
USPC .......................................................... 361/56
See application file for complete search history.

(56) References Cited

U.S. PATENT DOCUMENTS

| | | | |
|---|---|---|---|
| 6,258,634 | B1 | 7/2001 | Wang et al. |
| 7,932,582 | B2 | 4/2011 | Vashchenko |
| 9,601,480 | B2 | 3/2017 | Li et al. |
| 9,859,270 | B2 | 1/2018 | Russ et al. |
| 2002/0074604 | A1 | 6/2002 | Wang et al. |
| 2009/0032838 | A1 | 2/2009 | Tseng et al. |

(Continued)

FOREIGN PATENT DOCUMENTS

| | | | | |
|---|---|---|---|---|
| CN | 102569360 | A | * | 7/2012 |
| CN | 104928749 | A | | 9/2015 |

(Continued)

OTHER PUBLICATIONS

Machine translation of Zheng et al. Chinese Patent Document CN 102569360 A Jul. 2021 (Year: 2012).*

(Continued)

*Primary Examiner* — Kevin J Comber
(74) *Attorney, Agent, or Firm* — Sughrue Mion, PLLC

(57)          ABSTRACT

A device including a first clamp circuit connected between a first node and a second node, wherein the first clamp circuit includes: a symmetric bipolar transistor comprising a control terminal, a first current terminal and a second current terminal, wherein the first current terminal and the second current terminal are symmetrical to each other with respect to the control terminal; a first bipolar transistor electrically connected to the symmetric bipolar transistor and to the first node; and a second bipolar transistor electrically connected to the symmetric bipolar transistor and to the second node.

10 Claims, 28 Drawing Sheets

(56)                          References Cited

U.S. PATENT DOCUMENTS

2010/0109631  A1 *   5/2010  Vinson ................. H10D 89/711
                                                               323/282
2014/0332843  A1    11/2014  Clarke et al.
2016/0300831  A1    10/2016  Salman et al.

FOREIGN PATENT DOCUMENTS

JP           2003-105593  A     4/2003
KR      10-2010-0035983  A     4/2010
WO          2020/096579  A1     5/2020

OTHER PUBLICATIONS

Communication issued on Jun. 20, 2024 by the European Patent
Office for European Patent Application No. 23220265.5.
Office Action issued on Dec. 25, 2025 by the Chinese Patent Office
in corresponding CN Patent Application No. 202280011060.6.

* cited by examiner

: P+
: N+
: P-Well
: N-Well
: Deep N-Well
: P-Substrate

DEVICE FOR ELECTROSTATIC DISCHARGE PROTECTION USING SILICON CONTROLLED RECTIFIER

CROSS-REFERENCE TO RELATED APPLICATION

This application is based on and claims priority under 35 U.S.C. § 119 to Korean Patent Application No. 10-2023-0000367, filed on Jan. 2, 2023, in the Korean Intellectual Property Office, the disclosure of which is incorporated by reference herein in its entirety.

BACKGROUND

1. Field

The disclosure relates to a device for electrostatic discharge protection, and more particularly, to a device for electrostatic discharge protection using a silicon controlled rectifier.

2. Description of Related Art

Electrostatic discharge (ESD) may cause an integrated circuit to malfunction or even damage the integrated circuit. Accordingly, an integrated circuit may include a component for ESD protection, which may protect an internal circuit from ESD which has occurred outside the integrated circuit. According to the development of semiconductor process, sizes of elements included in an integrated circuit may be reduced, and operating voltages of elements included in an integrated circuit may decrease for reduced power consumption. In addition, frequencies of signals input to or output from an integrated circuit may increase for high performance. Accordingly, there is a need for components for ESD protection to have improved performance.

SUMMARY

Provided is a device for ESD protection which uses a silicon controlled rectifier to improve performance in providing electrostatic discharge protection.

Additional aspects will be set forth in part in the description which follows and, in part, will be apparent from the description, or may be learned by practice of the presented embodiments.

In accordance with an aspect of the disclosure, a device includes a first clamp circuit connected between a first node and a second node, wherein the first clamp circuit includes: a symmetric bipolar transistor comprising a control terminal, a first current terminal and a second current terminal, wherein the first current terminal and the second current terminal are symmetrical to each other with respect to the control terminal; a first bipolar transistor electrically connected to the symmetric bipolar transistor and to the first node; and a second bipolar transistor electrically connected to the symmetric bipolar transistor and to the second node.

In accordance with an aspect of the disclosure, a device includes a first clamp circuit connected between a first node and a second node, wherein the first clamp circuit includes: a symmetric PNP bipolar transistor comprising a control terminal, a first current terminal and a second current terminal, wherein the first current terminal and the second current terminal are symmetrical to each other with respect to the control terminal; a first NPN bipolar transistor comprising a first collector electrically connected to the control terminal, a first base electrically connected to the first current terminal, and a first emitter electrically connected to the first node; and a second NPN bipolar transistor comprising a second collector electrically connected to the control terminal, a second base electrically connected to the second current terminal, and a second emitter electrically connected to the second node.

In accordance with an aspect of the disclosure, a device includes a first clamp circuit connected between a first node and a second node, wherein the first clamp circuit includes: a symmetric NPN bipolar transistor comprising a control terminal, a first current terminal and a second current terminal, wherein the first current terminal and the second current terminal are symmetrical to each other with respect to the control terminal; a first PNP bipolar transistor comprising a first collector electrically connected to the control terminal, a first base electrically connected to the first current terminal, and a first emitter electrically connected to the first node; and a second PNP bipolar transistor comprising a second collector electrically connected to the control terminal, a second base electrically connected to the second current terminal, and a second emitter electrically connected to the second node.

BRIEF DESCRIPTION OF DRAWINGS

The above and other aspects, features, and advantages of certain embodiments of the present disclosure will be more clearly understood from the following detailed description taken in conjunction with the accompanying drawings, in which:

FIGS. 12A and 12B are diagrams illustrating examples of a layout of a clamp circuit according to some embodiments;

FIGS. 14A and 14B are diagrams illustrating examples of a layout of a clamp circuit according to some embodiments;

DETAILED DESCRIPTION

Figure 1:
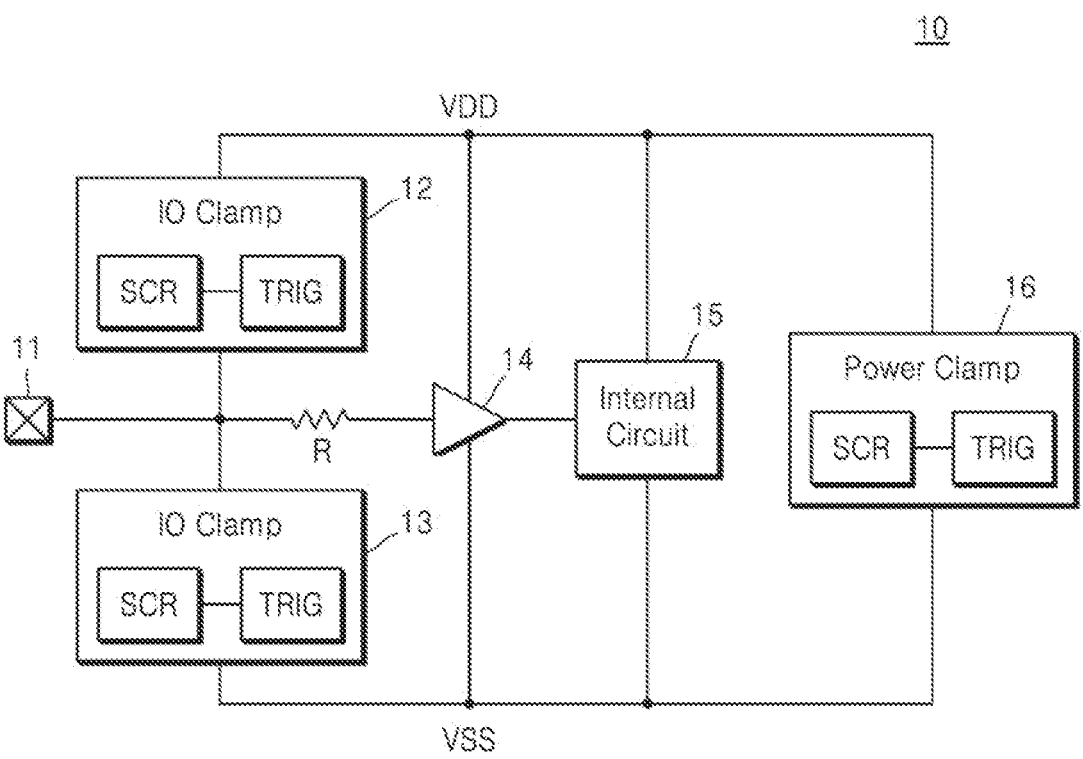
FIG. 1 is a block diagram of a device according to an embodiment.

Hereinafter, embodiments of the present disclosure will be described as follows with reference to the accompanying drawings.

As is traditional in the field, the embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the present scope. Further, the blocks, units and/or modules of the embodiments may be physically combined into more complex blocks, units and/or modules without departing from the present scope.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

FIG. 1 is a block diagram of a device 10 according to an embodiment. In some embodiments, the device 10 may include integrated circuits manufactured by a semiconductor process. For example, the device 10 may be a chip or a die, or may be a semiconductor package including at least one chip or die. As illustrated in FIG. 1, the device 10 may include an input/output (IO) pad 11, a first IO clamp 12, a second IO clamp 13, a resistor R, a buffer 14, an internal circuit 15, and a power clamp 16. As illustrated in FIG. 1, a positive supply voltage VDD may be applied to a positive supply voltage VDD node, and a negative supply voltage VSS may be applied to a negative supply voltage VSS node.

The IO pad 11 may be exposed to the outside of the device 10, and a signal received through the IO pad 11 may pass through the resistor R and the buffer 14 and be provided to the internal circuit 15. As illustrated in FIG. 1, the IO pad 11 may be connected to the first IO clamp 12 and the second IO clamp 13. Herein, when two or more components referred to as connected to each other, this may mean that the two or more components are electrically connected to each other. For example, when two components are referred to as being connected to each other via a resistor, the two components may be electrically connected to the resistor.

When an electrostatic discharge occurs at the IO pad 11, the first IO clamp 12 may form a discharge path of low impedance between the IO pad 11 and the positive supply voltage VDD node. Similarly, w % ben an electrostatic discharge occurs at the IO pad 11, the second IO clamp 13 may form a discharge path of low impedance between the IO pad 11 and the negative supply voltage VSS node. Moreover, when an electrostatic discharge occurs between the positive supply voltage VDD node and the negative supply voltage VSS node, the power clamp 16 may form a discharge path of low impedance between the positive supply voltage VDD node and the negative supply voltage VSS node. Accordingly, the internal circuit 15 may be protected from the electrostatic discharge by the first IO clamp 12, the second IO clamp 13, and the power clamp 16.

According to development of semiconductor process, the elements included in the internal circuit 15 may have a reduced size, and junction depth and thickness of gate oxide may also decrease. In addition, for low power consumption and high operation speed, an operating voltage of the internal circuit 15, for example, a voltage difference between the positive supply voltage VDD and the negative supply voltage VSS may decrease, and the frequency of signals input or output through the IO pad 11 may increase. Accordingly, the first IO clamp 12, the second IO clamp 13, and the power clamp 16 may be used to provide improved performance, such as a higher current drive ability, a lower operation inception voltage, a lower leakage current, a lower capacitance, etc.

As illustrated in FIG. 1, the first IO clamp 12, the second IO clamp 13, and the power clamp 16 may each include a silicon controlled rectifier SCR and a trigger circuit TRIG. The silicon controlled rectifier SCR may have a high current density based on double injection, and may provide high electrostatic discharge performance per unit area and reduced area and capacitance. However, as described below with reference to FIG. 3, the operation starting voltage of the silicon controlled rectifier SCR, which may be a snapback element, may be relatively high due to high breakdown voltage between wells, and when the electrostatic discharge protection is implemented only by the silicon controlled rectifier SCR, the internal circuit 15 having a low operating voltage may be damaged. The trigger circuit TRIG may allow the silicon controlled rectifier SCR to operate at a lower voltage, for example, at a lower trigger voltage.

Due to the electrostatic discharge, a high positive voltage or a high negative voltage may occur between the positive supply voltage VDD node and the IO pad 11. Accordingly, the first IO clamp 12 may be required to provide not only a discharge path from the IO pad 11 to the positive supply voltage VDD node but also a discharge path from the positive supply voltage VDD node to the IO pad 11. For example, when the first IO clamp 12 provides a bidirectional discharge path, the internal circuit 15 may be protected more safely from the electrostatic discharge. Similarly, the second IO clamp 13 and the power clamp 16 may also be required to provide a bidirectional discharge path. However, as described below with reference to FIGS. 4A and 4B, when a clamp circuit includes elements for bidirectional discharge path, the area of the clamp circuit may increase significantly, and efficiency of a device including the clamp circuit may decrease.

As described below, the first IO clamp 12, the second IO clamp 13, and the power clamp 16 may each include a symmetric bipolar transistor, and the silicon controlled rectifier SCR may have a symmetric structure. Accordingly, the first IO clamp 12, the second IO clamp 13, and the power clamp 16 may have a simple structure to provide a bidirectional discharge path, and may be able to reinforce the protection of the internal circuit 15 and improve efficiency of the device 10. A symmetric bipolar transistor may refer to a bipolar transistor having a symmetric structure of a collector and an emitter with respect to a base, as described below with reference to FIGS. 5A to 6B, and the collector and the emitter of the symmetric bipolar transistor may be determined according to a current direction. Herein, the base of the symmetric bipolar transistor may be referred to as a control terminal. One of the collector and the emitter may be referred to as a first current terminal, and the other one may be referred to as a second current terminal. In addition, a bipolar transistor having a collector and an emitter which are asymmetrical to each other with respect to a base may be referred to as an asymmetric bipolar transistor. Herein, a silicon controlled rectifier having a symmetric structure may be referred to as a symmetric silicon controlled rectifier.

Figure 2:
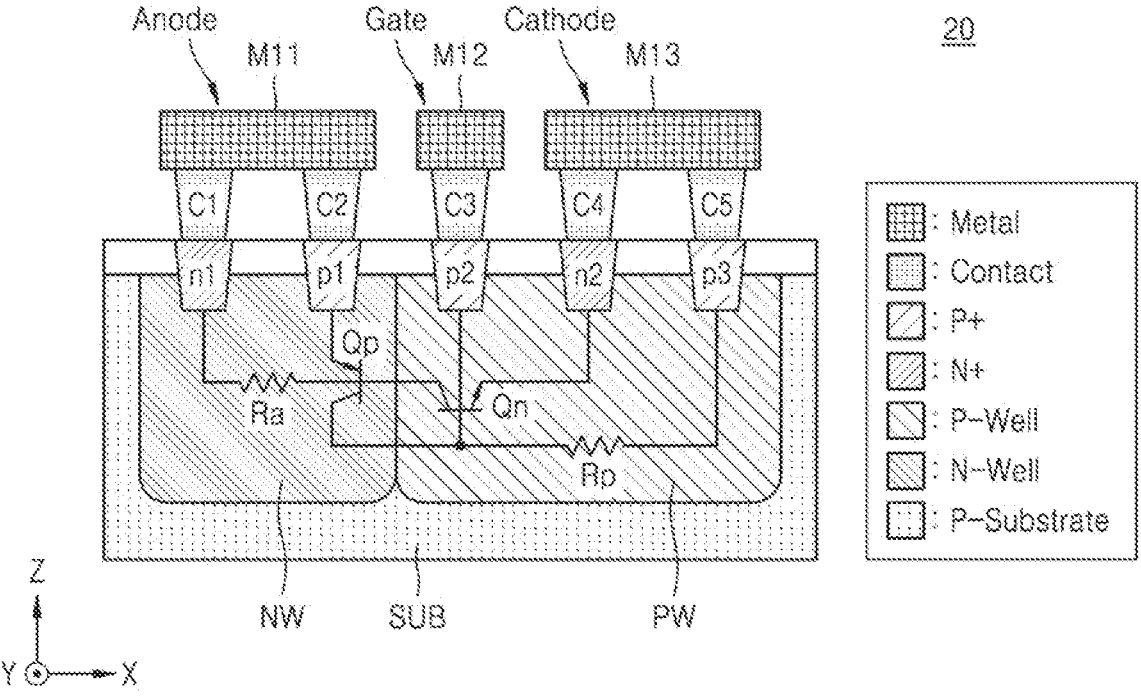
FIG. 2 is a cross-sectional view of a silicon controlled rectifier according to an embodiment.
Figure 3:
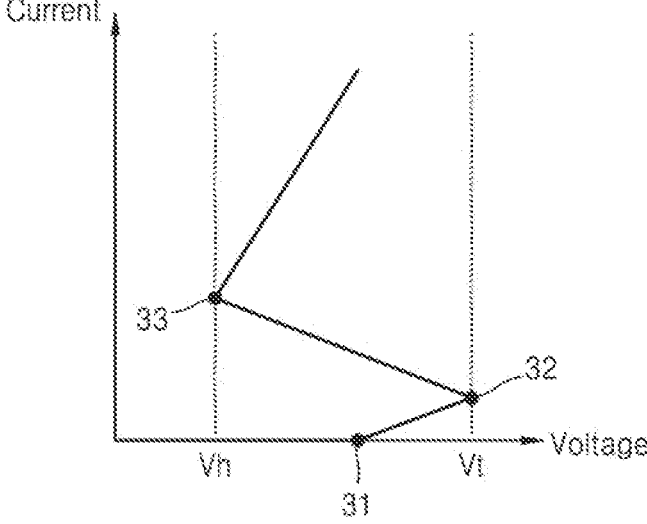
FIG. 3 is a graph showing characteristics of a silicon controlled rectifier according to an embodiment.

FIG. 2 is a cross-sectional view of a silicon controlled rectifier 20 according to an embodiment, and FIG. 3 is a graph showing characteristics of the silicon controlled rectifier 20 according to an embodiment. For example, FIG. 2 illustrates a cross-section of the silicon controlled rectifier 20 and an equivalent circuit in a plane including an X-axis and a Z-axis, and the graph of FIG. 3 shows a snapback curve of the silicon controlled rectifier 20.

Herein, the X-axis direction may be referred to as a first horizontal direction, and the Y-axis direction may be referred to as a second horizontal direction, and the Z-axis direction may be referred to as a vertical direction. A plane including an X-axis and a Y-axis may be referred to as a horizontal plane, a component relatively disposed in a +Z direction with respect to other components may be described as being disposed over or above the other components, and a component relatively disposed in a –Z direction with respect to other components may be described as being disposed under or below the other components. In addition, an area of a component may refer to an area occupied by the component in a plane parallel to the horizontal plane, and a width of a component may refer to a length in a direction perpendicular to a direction in which the component extends. A surface exposed in the +Z direction may be referred to as a top surface, and a surface exposed in the –Z direction may be referred to as a bottom surface. A surface exposed to the ±X directions or the ±Y directions may be referred to as a side surface. A pattern including a conductive material may be referred to as a conductive pattern, and may also be referred to as a pattern.

With reference to FIG. 2, the silicon controlled rectifier 20 may include a PNP bipolar transistor Qp and an NPN bipolar transistor Qn, and bases and collectors of the PNP bipolar transistor Qp and the NPN bipolar transistor Qn may be cross-coupled. For example, a base of the NPN bipolar transistor Qn may be connected to a collector of the PNP bipolar transistor Qp, and a collector of the NPN bipolar transistor Qn may be connected to a base of the PNP bipolar transistor Qp. An emitter of the PNP bipolar transistor Qp may be referred to as an anode of the silicon controlled rectifier 20, and a collector of the PNP bipolar transistor Qp and a base of the NPN bipolar transistor Qn, which may be interconnected to each other, may be referred to as a gate of the silicon controlled rectifier 20. An emitter of the NPN bipolar transistor Qn may be referred to a cathode of the silicon controlled rectifier 20.

The silicon controlled rectifier 20 may include a resistor Ra connected between an anode and a base of the PNP bipolar transistor Qp (or a collector of the NPN bipolar transistor Qn). In addition, the silicon controlled rectifier 20 may include a resistor Rp connected between a cathode and a base of the NPN bipolar transistor Qn (or the collector of the PNP bipolar transistor Qp). As illustrated in FIG. 2, the resistor Ra may include a resistor of an n-well NW and the resistor Rp may include a resistor of a p-well PW. As described below, the resistor Ra and/or the resistor Rp may be omitted in the silicon controlled rectifier 20.

As illustrated in FIG. 2, the silicon controlled rectifier 20 may include wells and doping regions disposed at the wells. For example, the n-well NW and the p-well PW may be disposed in a p-type substrate SUB. A first n+ region n1 and a first p+ region p1 may be disposed at the n-well NW, a second p+ region p2, a second n+ region n2, and a third p+ region p3 may be disposed at the p-well PW. Herein, an n+ region may have a higher n-type dopant concentration than an n-well, and a p+ region may have a higher p-type dopant concentration than a p-well. In addition, a deep n-well may have an -type dopant concentration that is similar to or lower than that of an n-well and lower than that of an n+ region.

A first contact C1 may be disposed in the first n+ region n1, and a second contact C2 may be disposed in the first p+ region p1. The first contact C1 and the second contact C2 may be connected to each other by a first pattern M11. A third contact C3 may be disposed in the second p+ region p2, and the third contact C3 may be disposed under a second pattern M12. A fourth contact C4 may be disposed in the second n+ region n2, and a fifth contact C5 may be disposed in the third p+ region p3. The fourth contact C4 and the fifth contact C5 may be connected to each other by a third pattern M13. The first to third patterns M11 to M13 may be patterns disposed in a wiring layer, for example, in a metal layer.

The PNP bipolar transistor Qp may include the first p+ region p1 (which may correspond to the emitter), the n-well NW (which may correspond to the base), and the p-well PW (which may correspond to the collector), and the NPN bipolar transistor Qn may include the second n+ region n2 (which may correspond to the emitter), the p-well PW (which may correspond to the base), and the n-well NW (which may correspond to the collector). The resistor Ra may correspond to a resistor of the N-well NW, and the resistor Rp may correspond to a resistor of the p-well PW. In some embodiments, the first n+ region n1 and/or the third p+ region p3 may be omitted, and accordingly, the resistor Ra and/or the resistor Rp may be omitted. In some embodiments, a via may be disposed between the contact and the pattern.

With reference to FIG. 3, the silicon controlled rectifier 20 may have characteristics corresponding to the snapback curve. For example, as a voltage between an anode and a cathode increases, a breakdown between the n-well NW and the p-well PW may occur at a first point 31. At a second point 32, the PNP bipolar transistor Qp and the NPN bipolar transistor Qn may each be turned on by the voltage which has reached the trigger voltage Vt, and accordingly, the voltage may decrease, and the current may increase. At a third point 33, the voltage may reach a bipolar hold voltage Vh, and in a latch mode, an electrostatic discharge current may flow. Herein, the bipolar hold voltage Vh may be referred to as a hold voltage. The trigger voltage Vt may reach, for example, about 18 V to about 20 V due to a high breakdown voltage between the n-well NW and the p-well PW (e.g., the voltage at the first point 31), and may not be suitable for protection of elements in the internal circuit which have a low operating voltage, such as 3 V or 1.5 V. As described above with reference to FIG. 1, the IO clamp 13 of FIG. 1 may include a trigger circuit capable of lowering the trigger voltage Vt at the silicon controlled rectifier 20.

Figure 4A:
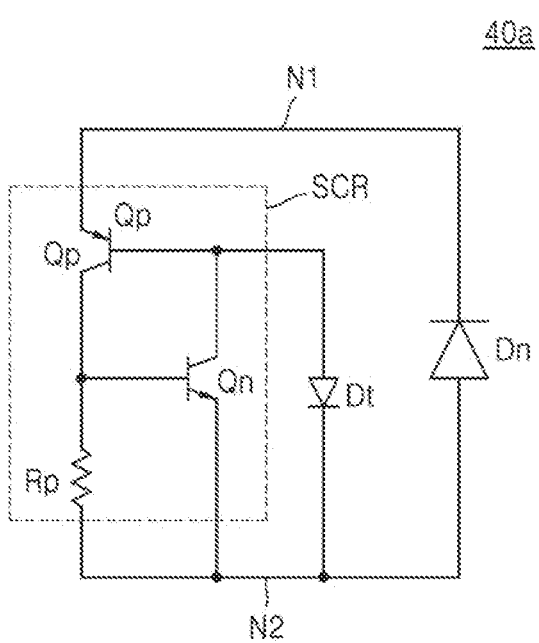
FIGS. 4A and 4B are circuit diagrams illustrating examples of a clamp circuit according to some embodiments.
Figure 4B:
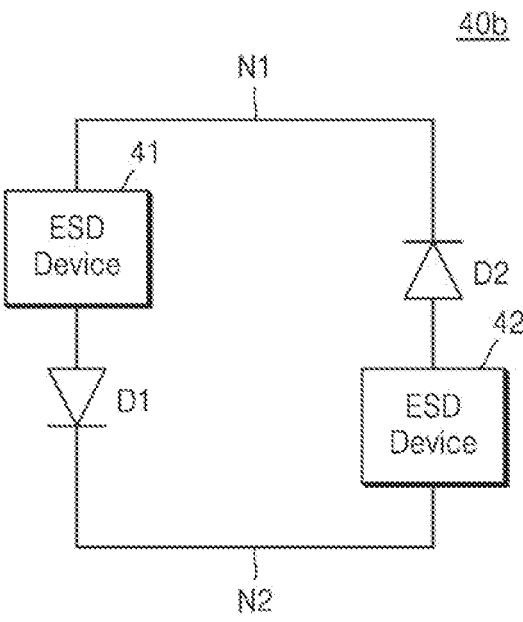

FIGS. 4A and 4B are circuit diagrams illustrating examples of a clamp circuit according to some embodiments. For example, the circuit diagrams of FIGS. 4A and 4B may illustrate clamp circuits 40a and 40b which may provide a bidirectional discharge path when an electrostatic discharge occurs between a first node N1 and a second node N2.

With reference to FIG. 4A, the clamp circuit 40a may include the silicon controlled rectifier SCR, a trigger diode Dt, and a negative diode Dn. The silicon controlled rectifier SCR may include the PNP bipolar transistor Qp, the NPN bipolar transistor Qn, and the resistor Rp. The trigger diode Dt may be connected between the base of the PNP bipolar transistor Qp and the second node N2 in a forward direction. In embodiments, a forward direction of a diode may refer to a direction from an anode to a cathode. Further, a diode connected in a forward direction from a first element to a second element may be referred to as being forwardly connected from the first element to the second element. Therefore, in embodiments, when a diode is forwardly connected from a first element to a second element, this may mean that an anode of the diode is connected to the first element, and that a cathode of the diode is connected to the second element.

As described with reference to FIGS. 2 and 3, the silicon controlled rectifier SCR may have a relatively high trigger voltage Vt, and the trigger diode Dt may cause a trigger current which passes through the PNP bipolar transistor Qp and the trigger diode Dt and flows from the first node N1 to the second node N2 when a high positive voltage occurs between the first node N1 and the second node N2. Accordingly, the trigger voltage of the silicon controlled rectifier SCR may decrease. In some embodiments, the trigger diode Dt of FIG. 4A may be replaced with two or more diodes connected in series.

In order to generate a discharge path from the second node N2 to the first node N1 when a high negative voltage occurs between the first node N1 and the second node N2, the negative diode Dn may be forwardly connected from the second node N2 to the first node N1. In some embodiments, the negative diode Dn may include a p-type substrate and an n-well, and may have a wide area. Accordingly, the area of the clamp circuit 40a may increase, and the impedance of the first node N1 and/or the second node N2 may increase as well.

With reference to FIG. 4B, the clamp circuit 40b may include a first electrostatic discharge (ESD) device 41, a second ESD device 42, a first diode D1, and a second diode D2. The first ESD device 41 and the first diode D1 may provide a discharge path from the first node N1 to the second node N2, and the second ESD device 42 and the second diode D2 may provide a discharge path from the second node N2 to the first node N1. Accordingly, the area of the clamp circuit 40b may increase, and the impedance of the first node N1 and/or the second node N2 may increase as well.

Figure 5A:
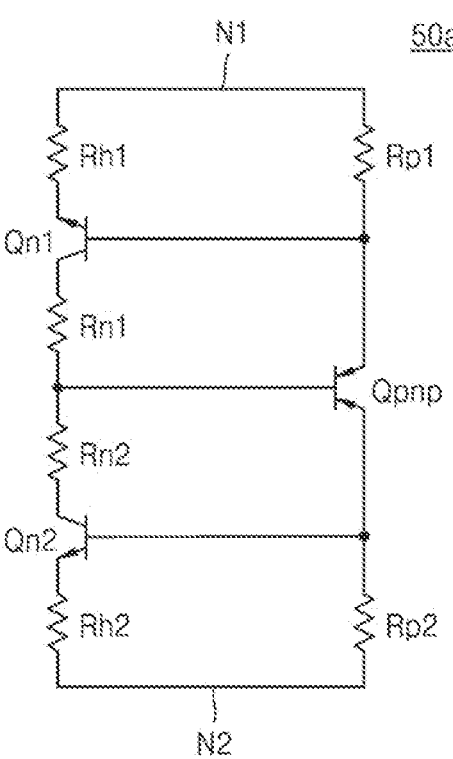
FIGS. 5A and 5B are circuit diagrams illustrating examples of a clamp circuit according to some embodiments.
Figure 5B:
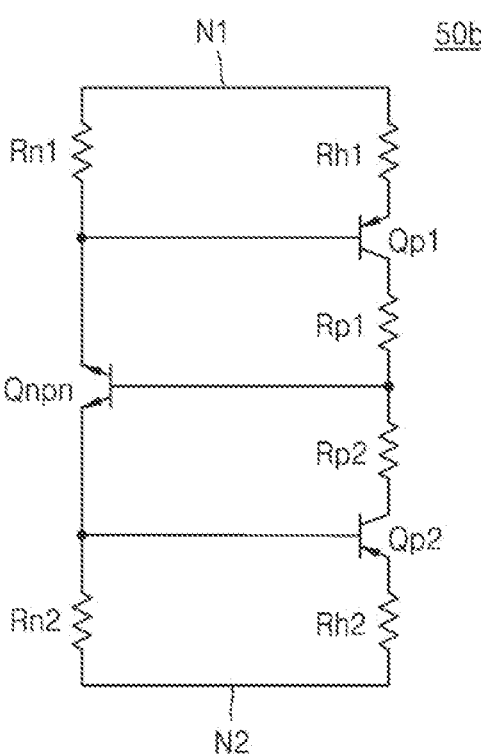

FIGS. 5A and 5B are circuit diagrams illustrating examples of a clamp circuit according to some embodiments. For example, the circuit diagram of FIG. 5A illustrates a clamp circuit 50a including a PNP bipolar transistor Qpnp as a symmetric bipolar transistor, and the circuit diagram of FIG. 5B illustrates a clamp circuit 50b including an NPN bipolar transistor Qnpn as a symmetric bipolar transistor.

With reference to FIG. 5A, the clamp circuit 50a may include a symmetric PNP bipolar transistor Qpnp, a first NPN bipolar transistor Qn1, and a second NPN bipolar transistor Qn2, and may also include resistors Rh1, Rh2, Rp1, Rp2, Rn1, and Rn2. Each of the first NPN bipolar transistor Qn1 and the second NPN bipolar transistor Qn2 may be an asymmetric bipolar transistor. Each of the resistors Rh1, Rh2, Rp1, Rp2, Rn1, and Rn2 may include a well resistor as described above with reference to FIG. 2.

When a high positive voltage (which may be referred to as a forward voltage herein) occurs between the first node N1 and the second node N2, a discharge path including the resistor Rp1, the symmetric PNP bipolar transistor Qpnp and the second NPN bipolar transistor Qn2, for example, a forward discharge path, may be formed. In addition, when a high negative voltage (which may be referred to as a reverse voltage herein) occurs between the first node N1 and the second node N2, a discharge path including the resistor Rp2, the symmetric PNP bipolar transistor Qpnp and the first NPN bipolar transistor Qn1, for example, a reverse discharge path may be formed. As described below with reference to FIG. 6A, the layout of the clamp circuit 50a may have a simple structure or a small area.

With reference to FIG. 5B, the clamp circuit 50b may include a symmetric NPN bipolar transistor Qnpn, a first PNP bipolar transistor Qp1, and a second PNP bipolar transistor Qp2, and may also include resistors Rh1, Rh2, Rn1, Rn2, Rp1, and Rp2. Each of the first PNP bipolar transistor Qp1 and the second PNP bipolar transistor Qp2 may be an asymmetric bipolar transistor. Each of the resistors Rh1, Rh2, Rn1, Rn2, Rp1, and Rp2 may include a well resistor as described above with reference to FIG. 2.

When a forward voltage occurs, a forward discharge path including the resistor Rh1, the first PNP bipolar transistor Qp1, the symmetric NPN bipolar transistor Qnpn, and the resistor Rh2 may be formed. In addition, when a reverse voltage occurs, a reverse discharge path including the resistor Rh2, the second PNP bipolar transistor Qp2, and the resistor Rh1 may be formed. As described below with reference to FIG. 6B, the layout of the clamp circuit 50b may have a simple structure or a small area.

Figure 6A:
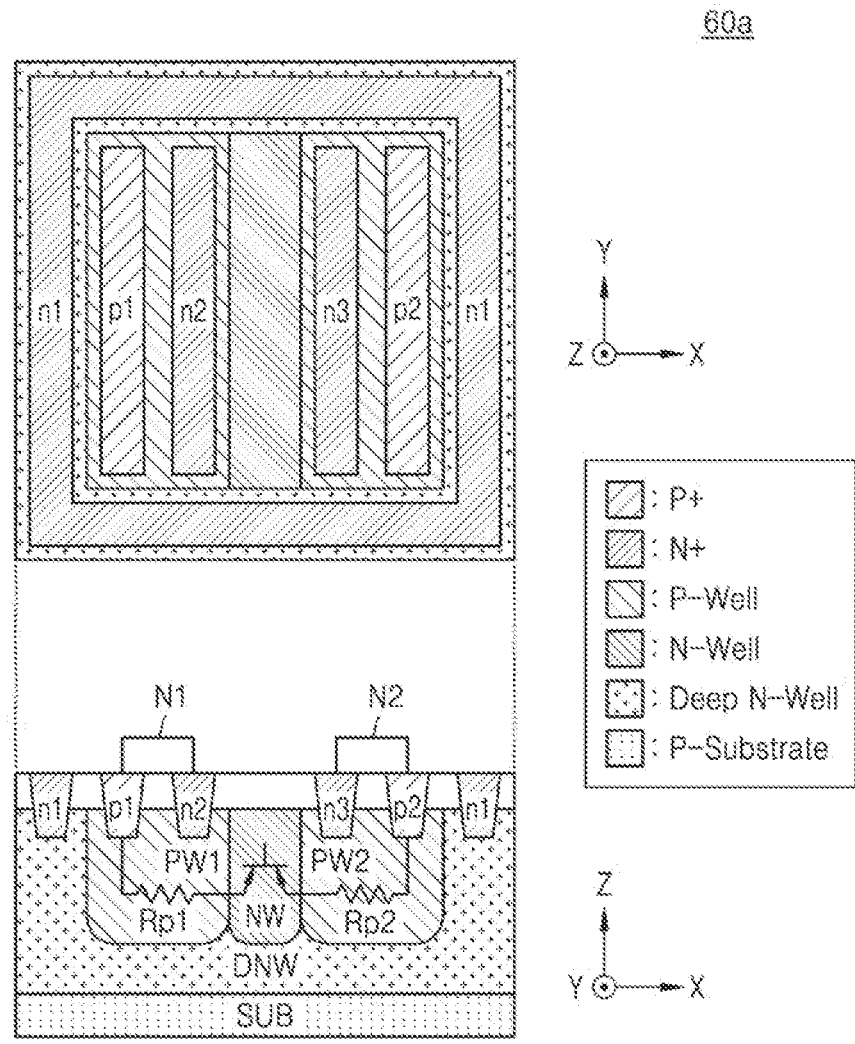
FIGS. 6A and 6B are diagrams illustrating examples of a layout of a clamp circuit according to some embodiments.
Figure 6B:
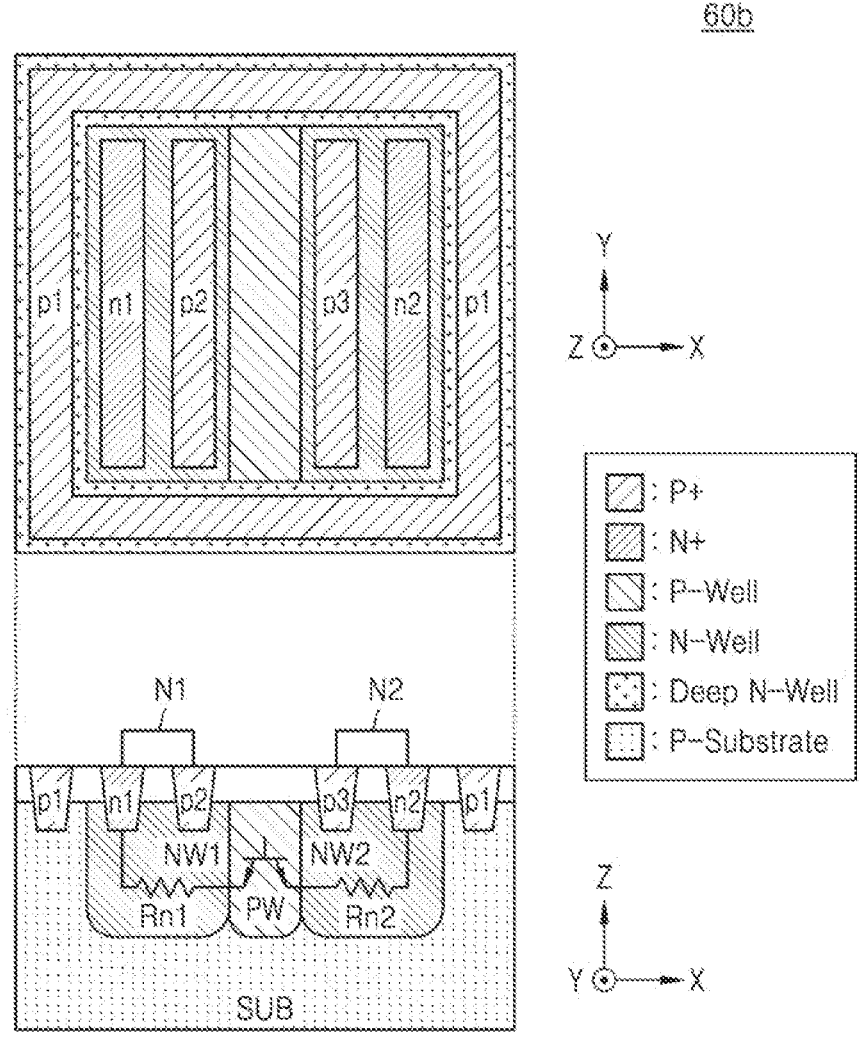

FIGS. 6A and 6B are diagrams illustrating examples of a layout of a clamp circuit according to some embodiments. For example, FIG. 6A shows a plan view and a cross-sectional view of a layout 60a corresponding to the clamp circuit 50a of FIG. 5A, and FIG. 6B shows plan view of a cross-sectional view of a layout 60b corresponding to the clamp circuit 50b of FIG. 5B. In FIGS. 6A and 6B, contacts and patterns for connecting n+ regions and gates with each other may be omitted for convenience in illustration. The clamp circuits 50a and 50b of FIGS. 5A and 5B are not limited to the layouts 60a and 60b of FIGS. 6A and 6B. Hereinafter, FIGS. 6A and 6B are described with reference to FIGS. 5A and 5B.

With reference to FIG. 6A, a deep n-well DNW may be disposed in a substrate SUB including p-type impurities. In the deep n-well DNW, a first p-well PW1, an n-well NW, and a second p-well PW2 may be disposed sequentially, and the n-well NW may abut each of the first p-well PW1 and the second p-well PW2. The first n+ region n1 may surround the first p-well PW1, the n-well NW, and the second p-well PW2 on the deep n-well DNW, and the positive supply voltage VDD may be applied thereto. The first p-well PW1, the n-well NW, and the second p-well PW2 may be included in a symmetric PNP bipolar transistor, and the first p-well PW1 and the second p-well PW2 may be symmetrical to each other with respect to the n-well NW.

The first p+ region p1 and the second n+ region n2 may be disposed at the first p-well PW1. The first p-well PW1 may be connected to the first node N1 through the first p+ region p1, and the resistor Rp1 may occur as a well resistor. The second n+ region n2 may be connected to the first node N1, and may correspond to an emitter of the first NPN bipolar transistor Qn1. In addition, the first p-well PW1 may correspond to a base of the first NPN bipolar transistor Qn1, and the n-well NW may correspond to a collector of the first NPN bipolar transistor Qn1.

A third n+ region n3 and a second p+ region p2 may be disposed at the second p-well PW2. The second p-well PW2 may be connected to the second node N2 through the second p+ region p2, and the well resistor Rp2 may occur therein. The third n+ region n3 may be connected to the second node N2, and may correspond to an emitter of the second NPN bipolar transistor Qn2. In addition, the second p-well PW2 may correspond to a base of the second NPN bipolar transistor Qn2, and the n-well NW may correspond to a collector of the second NPN bipolar transistor Qn2.

With reference to FIG. 6B, a first n-well NW1, a p-well PW, and a second n-well NW2 may be sequentially disposed in the substrate SUB including p-type impurities, and the p-well PW may abut each of the first n-well NW1 and the second n-well NW2. The first p+ region p1 may surround the first n-well NW1, the p-well PW, and the second n-well NW2 on the substrate SUB, and the negative supply voltage VSS may be applied thereto. The first n-well NW1, the p-well PW, and the second n-well NW2 may be included in a symmetric NPN bipolar transistor, and the first n-well NW1 and the second n-well NW2 may be symmetrical to each other with respect to the p-well PW.

The first n+ region n1 and the second p+ region p2 may be disposed at the first n-well NW1. The first n-well NW1 may be connected to the first node N1 through the first n+ region n1, and the resistor Rn1 may occur as a well resistor. The second p+ region p2 may be connected to the first node N1, and may correspond to an emitter of the first PNP bipolar transistor Qp1. In addition, the first n-well NW1 may correspond to a base of the first PNP bipolar transistor Qp1, and the p-well PW may respectively correspond to a collector of the first PNP bipolar transistor Qp1.

The third p+ region p3 and the second n+ region n2 may be disposed at the second n-well NW2. The second n-well NW2 may be connected to the second node N2 through the second n+ region n2, and the well resistor Rn2 may occur therein. The third p+ region p3 may be connected to the second node N2, and may correspond to an emitter of the second PNP bipolar transistor Qp2. In addition, the second n-well NW2 may correspond to a base of the second PNP bipolar transistor Qp2, and the p-well PW may correspond to a collector of the second PNP bipolar transistor Qp2.

Figure 7A:
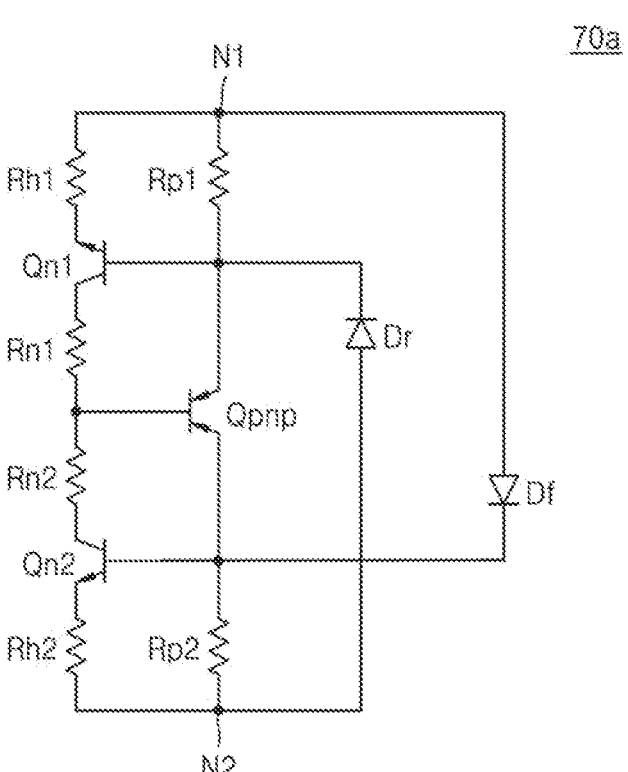
FIGS. 7A and 7B are circuit diagrams illustrating examples of a clamp circuit according to some embodiments.
Figure 7B:
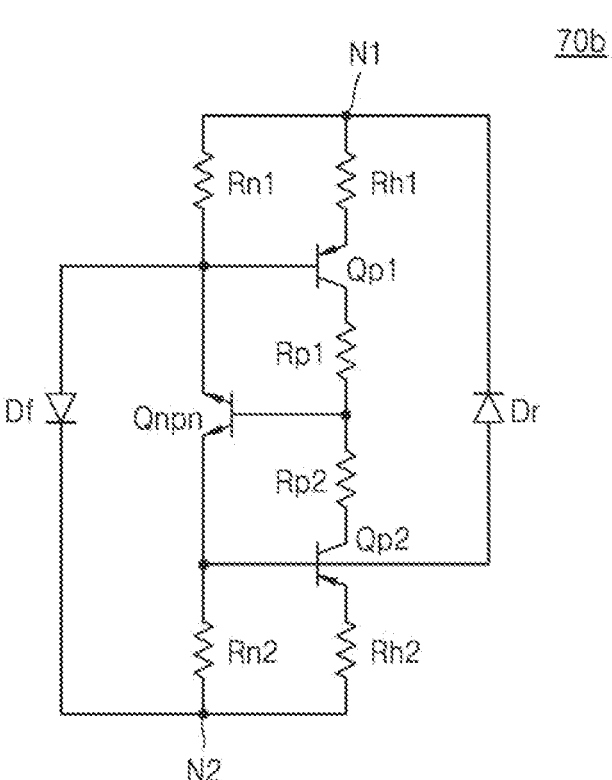

FIGS. 7A and 7B are circuit diagrams illustrating examples of a clamp circuit according to some embodiments. For example, the circuit diagram of FIG. 7A illustrates a clamp circuit 70a including a PNP bipolar transistor Qpnp as a symmetric bipolar transistor, and the circuit diagram of FIG. 7B illustrates a clamp circuit 70b including an NPN bipolar transistor Qnpn as a symmetric bipolar transistor. When compared to the clamp circuits 50a and 50b of FIGS. 5A and 5B, the clamp circuits 70a and 70b of FIGS. 7A and 7B may further include diodes Dr and Df. In some embodiments, each of the forward diode Df and the reverse diode Dr may be respectively replaced with two or more diodes connected in series. Hereinafter, redundant or duplicative description may be omitted in describing embodiments with reference to FIGS. 7A and 7B.

With reference to FIG. 7A, the clamp circuit 70a may include a symmetric PNP bipolar transistor Qpnp, a first NPN bipolar transistor Qn1, a second NPN bipolar transistor Qn2, and resistors Rh1, Rh2, Rp1, Rp2, Rn1, and Rn2. Each of the first NPN bipolar transistor Qn1 and the second NPN bipolar transistor Qn2 may be an asymmetric bipolar transistor. Each of the resistors Rh1, Rh2, Rp1, Rp2, Rn1, and Rn2 may include a well resistor as described above with reference to FIG. 2.

The clamp circuit 70a may further include the forward diode Df and the reverse diode Dr. The forward diode Df and the reverse diode Dr may function as a trigger circuit and may lower a trigger voltage of the clamp circuit 70a. For example, when a forward voltage occurs, a trigger current may flow through the forward diode Df and the second NPN bipolar transistor Qn2, and then the current may flow through the resistor Rp1, the symmetric PNP bipolar transistor Qpnp, and the second NPN bipolar transistor Qn2. When a reverse voltage occurs, a trigger current may flow through the reverse diode Dr and the first NPN bipolar transistor Qn1, and then the current may flow through the resistor Rp2, the symmetric PNP bipolar transistor Qpnp, and the first NPN bipolar transistor Qn1.

With reference to FIG. 7B, the clamp circuit 70b may include a symmetric NPN bipolar transistor Qnpn, a first PNP bipolar transistor Qp1, a second PNP bipolar transistor Qp2, and resistors Rh1. Rh2, Rp1, Rp2, Rn1, and Rn2. Each of the first PNP bipolar transistor Qp1 and the second PNP bipolar transistor Qp2 may be an asymmetric bipolar transistor. Each of the resistors Rh1, Rh2, Rp1, Rp2, Rn1, and Rn2 may include a well resistor as described above with reference to FIG. 2.

The clamp circuit 70b may further include the forward diode Df and the reverse diode Dr. The forward diode Df and the reverse diode Dr may function as a trigger circuit and may lower a trigger voltage of the clamp circuit 70b. For example, when a forward voltage occurs, a trigger current may flow through the resistor Rh1, the first PNP bipolar transistor Qp1, and the forward diode Df, and then the current may flow through the resistor Rh1, the first PNP bipolar transistor Qp1, the symmetric NPN bipolar transistor Qnpn, and the resistor Rn2. When a reverse voltage occurs, a trigger current may flow through the resistor Rh2, the second PNP bipolar transistor Qp2, and the reverse diode Dr, and then the current may flow through the resistor Rh2, the second PNP bipolar transistor Qp2, the symmetric NPN bipolar transistor Qnpn, and the resistor Rn1.

Figure 8:
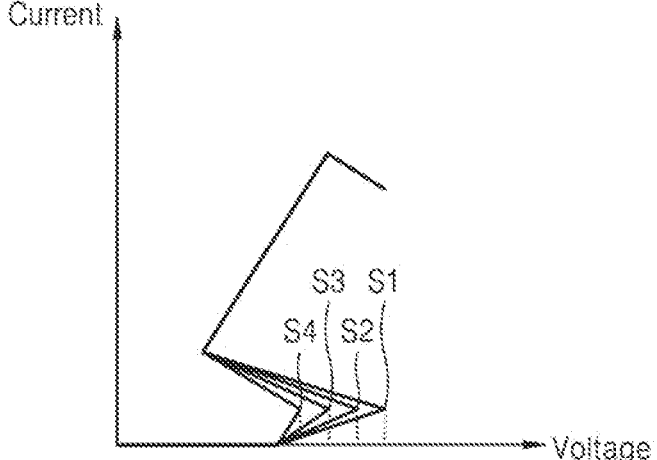
FIG. 8 is a graph showing characteristics of a clamp circuit according to an embodiment.

FIG. 8 is a graph showing characteristics of a clamp circuit according to an embodiment. For example, the graph of FIG. 8 shows snapback curves S1 to S4 corresponding to the clamp circuits 70a and 70b of FIGS. 7A and 7B. Hereinafter, FIG. 8 will be explained with reference to FIGS. 7A and 7B.

As described above with reference to FIGS. 7A and 7B, a clamp circuit may include two or more forward diodes connected in series and/or two or more reverse diodes connected in series, and a trigger voltage of the clamp circuit may rely on the number of diodes. For example, when a clamp circuit includes one forward diode or one reverse diode as in the clamp circuits 70a and 70b of FIGS. 7A and 7B, a trigger current may occur at a low voltage as shown by the first snapback curve S1, and accordingly, the trigger voltage may be low. When a trigger circuit include two to four forward diodes or four reverse diodes, as shown by the second to fourth snapback curves S2 to S4, respectively, a voltage at which a trigger current occurs may increase, and accordingly, the trigger voltage may also increase. Hereinafter, examples in which a clamp circuit includes one forward diode and one reverse diode are described with reference to the accompanying drawings; however, it will be understood that a clamp circuit may also two or more forward diodes and/or reverse diodes connected in series according to a required trigger voltage.

Figure 9A:
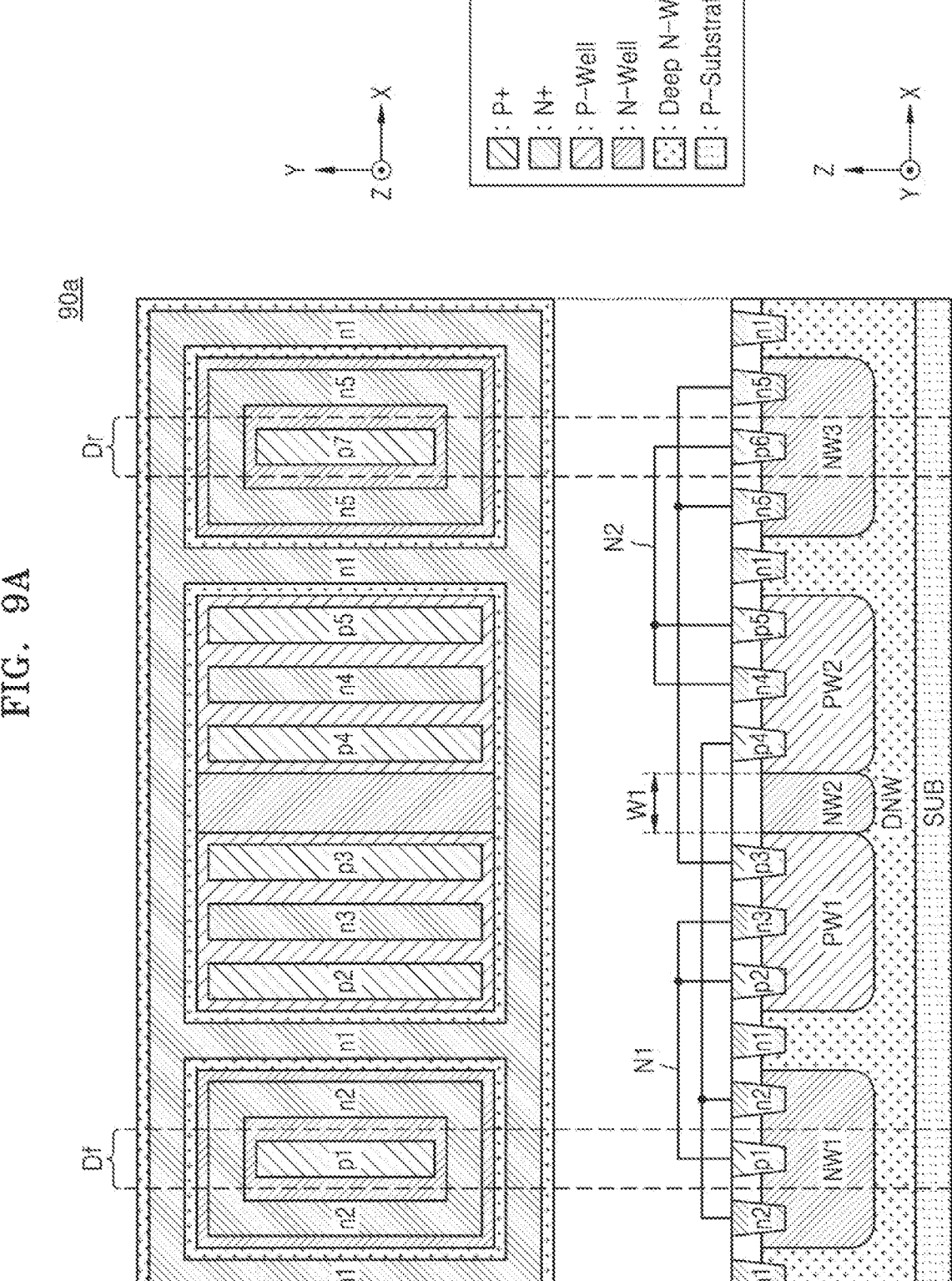
FIGS. 9A and 9B are diagrams illustrating examples of a layout of a clamp circuit according to some embodiments.
Figure 9B:
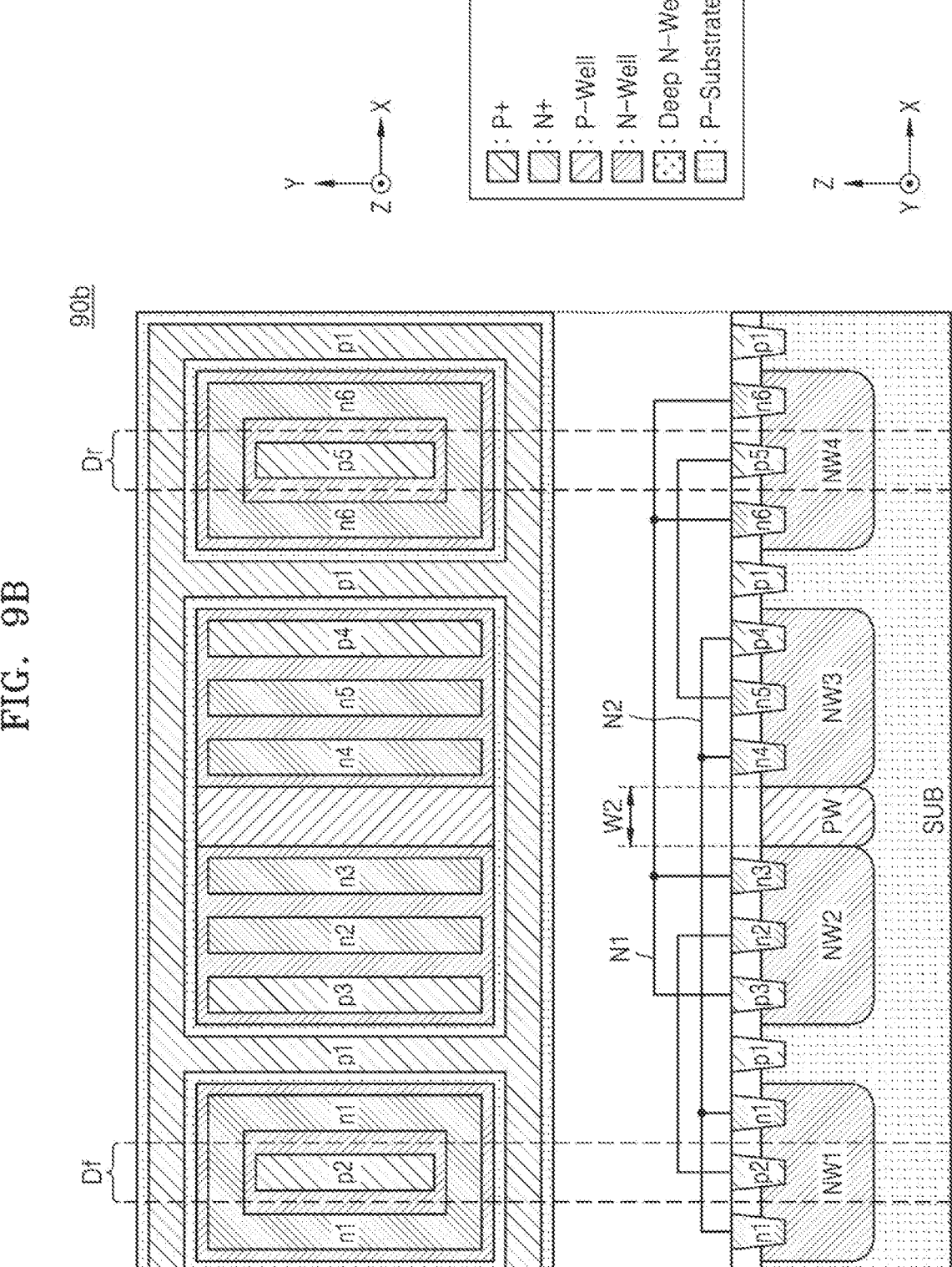

FIGS. 9A and 9B are diagrams illustrating examples of a layout of a clamp circuit according to some embodiments. For example, FIG. 9A shows a plan view and a cross-sectional view of a layout 90a corresponding to the clamp circuit 70a of FIG. 7A, and FIG. 9B shows plan view of a cross-sectional view of a layout 90b corresponding to the clamp circuit 70b of FIG. 7B. In FIGS. 9A and 9B, contacts and patterns for connecting n+ regions and gates with each other may be omitted for convenience in illustration. The clamp circuits 70a and 70b of FIGS. 7A and 7B are not limited to the layouts 90a and 90b of FIGS. 9A and 9B. Hereinafter, FIGS. 9A and 9B are described with reference to FIGS. 7A and 7B.

With reference to FIG. 9A, a deep n-well DNW may be disposed in a substrate SUB including p-type impurities. In the deep n-well DNW, a first p-well PW1, a second n-well NW2, and a second p-well PW2 may be disposed sequentially, and the second n-well NW2 may abut each of the first p-well PW1 and the second p-well PW2. As illustrated in FIG. 9A, the second n-well NW2 may have a first width W1 as a length in the X-axis direction. In addition, in the deep n-well DNW, the first n-well NW1 may be apart from the first p-well PW1, and the third n-well NW3 may be apart from the second p-well PW2. The first n+ region n1 may surround each of the first n-well NW1 and the third n-well NW3 on the deep n-well DNW, and surround the first p-well PW1, the second n-well NW2, and the second p-well PW2 which are disposed sequentially, and the positive supply voltage VDD may be applied thereto.

The second n+ region n2 and the first p+ region p1 may be disposed at the first n-well NW1. The second n+ region n2 may surround the first p+ region p1 on the first n-well NW1, and may be connected to the second p-well PW2, which may be a base of the second NPN bipolar transistor Qn2, through a fourth p+ region p4. The first p+ region p1 may be included in the forward diode Df together with the first n-well NW1 and may be connected to the first node N1.

The second p+ region p2, the third n+ region n3, and the third p+ region p3 may be disposed at the first p-well PW1. The first p-well PW1 may be connected to the first node N1 through the second p+ region p2. The third n+ region n3 may be connected to the first node N1 and may correspond to an emitter of the first NPN bipolar transistor Qn1. The third p+ region p3 may be connected to the third n-well NW3, which may be a cathode of the reverse diode Dr, through a fifth n+ region n5.

The fourth p+ region p4, the fourth n+ region n4, and the fifth p+ region p5 may be disposed at the second p-well PW2. The fourth p+ region p4 may be connected to the first n-well NW1, which may be a cathode of the forward diode Df, through the second n+ region n2. The fourth n+ region n4 may be connected to the second node N2 and may correspond to an emitter of the second NPN bipolar transistor Qn2. The second p-well PW2 may be connected to the second node N2 through the fifth p+ region p5.

The fifth n+ region n5 and a sixth p+ region p6 may be disposed at the third n-well NW3. The fifth n+ region n5 may surround the sixth p+ region p6 on the third n-well NW3, and may be connected to the first p-well PW1, which may be a base of the first NPN bipolar transistor Qn1, through the third p+ region p3. The sixth p+ region p6 may be included in the reverse diode Dr together with the third n-well NW3 and may be connected to the second node N2.

With reference to FIG. 9B, the second n-well NW2, the p-well PW, and the third n-well NW3 may be sequentially disposed in the substrate SUB including p-type impurities, and the p-well PW may abut each of the second n-well NW2 and the third n-well NW3. As illustrated in FIG. 9B, the p-well PW may have a second width W2 as a length in the X-axis direction. In the substrate SUB, the first n-well NW1 may be apart from the second n-well NW2, and the fourth n-well NW4 may be apart from the third n-well NW3. The first p+ region p1 may surround each of the first n-well NW1 and the fourth n-well NW4 on the substrate SUB, and surround the second n-well NW2, the p-well PW, and the third n-well NW3, which are disposed sequentially, and the negative supply voltage VSS may be applied thereto.

The first n+ region n1 and the second p+ region p2 may be disposed at the first n-well NW1. The first n+ region n1 may surround the second p+ region p2 on the first n-well NW1, and may be connected to the third n-well NW3, which may be a base of the second PNP bipolar transistor Qp2, through the fourth n+ region n4. The second p+ region p2 may be included in the forward diode Df together with the first n-well NW1 and may be connected to the second n+ region n2.

The third p+ region p3, the second n+ region n2, and the third n+ region n3 may be disposed at the second n-well NW2. The third p+ region p3 may be connected to the first node N1 and may correspond to an emitter of the first PNP bipolar transistor Qp1. The second n+ region n2 may be connected to the second p+ region p2, which may be an anode of the forward diode Df. The second n-well NW2 may be connected to the first node N1 through the third n+ region n3.

The fourth n+ region n4, the fifth n+ region n5, and the fourth p+ region p4 may be disposed at the third n-well NW3. The third n-well NW3 may be connected to the second node N2 through the fourth n+ region n4. The fifth n+ region n5 may be connected to the fifth p+ region p5, which may be an anode of the reverse diode Dr. The fourth p+ region p4 may be connected to the second node N2 and correspond to an emitter of the second PNP bipolar transistor Qp2.

The fifth p+ region p5 and a sixth n+ region n6 may be disposed at the fourth n-well NW4. The sixth n+ region n6 may surround the fifth p+ region p5 on the fourth n-well NW4 and may be connected to the first node N1. The fifth p+ region p5 may be included in the reverse diode Dr together with the fourth n-well NW4, and may be connected to the third n-well NW3, which may be a base of the second PNP bipolar transistor Qp2, through the fifth n+ region n5.

Figure 10:
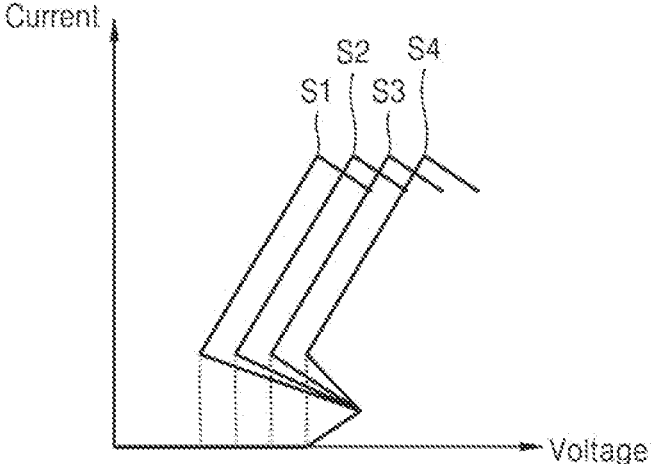
FIG. 10 is a graph showing characteristics of a clamp circuit according to an embodiment.

FIG. 10 is a graph showing characteristics of a clamp circuit according to an embodiment. For example, the graph of FIG. 10 shows snapback curves S1 to S4 corresponding to the clamp circuits 70a and 70b of FIGS. 7A and 7B. The clamp circuits 70a and 70b may respectively correspond to the layouts 90a and 90b of FIGS. 9A and 9B. Hereinafter, FIG. 10 will be explained with reference to FIGS. 9A and 9B.

With reference to FIG. 10, a base (or a control terminal) of a symmetric bipolar transistor of a clamp circuit may have a width adjusted according to a desired hold voltage. For example, in the layout 90a of FIG. 9A, a symmetric PNP bipolar transistor may include a base having the first width W1, and the first width W1 may correspond to a distance between the first p-well PW1 and the second p-well PW2. In addition, in the layout 90b of FIG. 9B, a symmetric NPN bipolar transistor may include a base having the second width W2, and the second width W2 may correspond to a distance between the second n-well NW2 and the third n-well NW3. As the first width W1 and the second width W2 increase, the hold voltage may rise as shown in the first to fourth snapback curves S1 to S4 of FIG. 10.

Figure 11A:
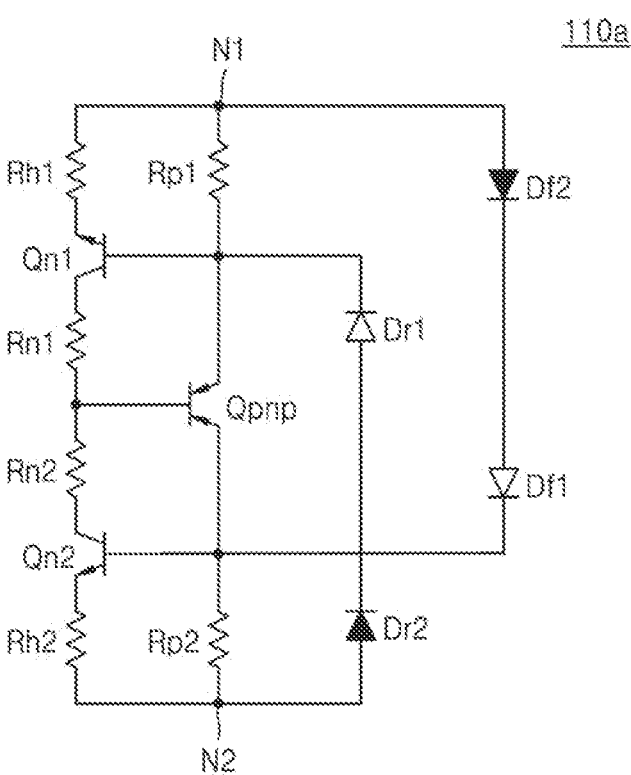
FIGS. 11A and 11B are circuit diagrams illustrating examples of a clamp circuit according to some embodiments.
Figure 11B:
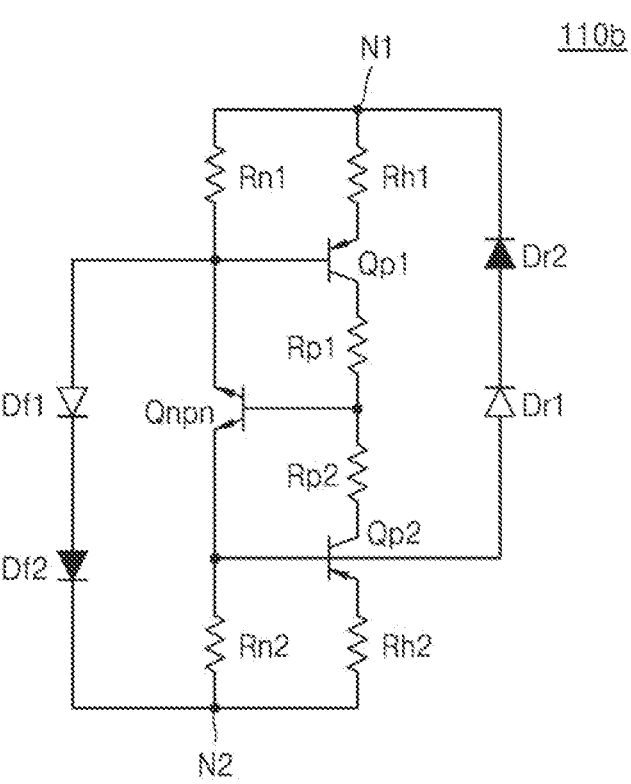

FIGS. 11A and 11B are circuit diagrams illustrating examples of a clamp circuit according to some embodiments. For example, the circuit diagram of FIG. 11A illustrates a clamp circuit 110a including a PNP bipolar transistor Qpnp as a symmetric bipolar transistor, and the circuit diagram of FIG. 11B illustrates a clamp circuit 110b including an NPN bipolar transistor Qnpn as a symmetric bipolar transistor. When compared to the clamp circuits 70a and 70b of FIGS. 7A and 7B, the clamp circuits 110a and 110b of FIGS. 11A and 11B may further include an additional forward diode and an additional reverse diode. Hereinafter, redundant description or duplicative may be omitted in describing embodiments with reference to FIGS. 11A and 11B.

With reference to FIG. 11A, the clamp circuit 110a may include a symmetric PNP bipolar transistor Qpnp, a first NPN bipolar transistor Qn1, a second NPN bipolar transistor Qn2, and resistors Rh1, Rh2, Rp1, Rp2, Rn1, and Rn2. Each of the first NPN bipolar transistor Qn1 and the second NPN bipolar transistor Qn2 may be an asymmetric bipolar transistor. Each of the resistors Rh1, Rh2, Rp1, Rp2, Rn1, and Rn2 may include a well resistor as described above with reference to FIG. 2.

The clamp circuit 110a may include a first forward diode Df1 and a second forward diode Df2. In some embodiments, as described below with reference to FIG. 12A, the first forward diode Df1 may include a separate n-well and p+ region, whereas the second forward diode Df2 may include a p-well and an n+ region of the symmetric PNP bipolar transistor Qpnp. In addition, the clamp circuit 110a may include a first reverse diode Dr1 and a second reverse diode Dr2. In some embodiments, as described below with reference to FIG. 12A, the first reverse diode Dr1 may include a separate n-well and p+ region, whereas the second reverse diode Dr2 may include a p-well and an n+ region of the symmetric PNP bipolar transistor Qpnp.

With reference to FIG. 1B, the clamp circuit 110b may include a symmetric NPN bipolar transistor Qnpn, a first PNP bipolar transistor Qp1, a second PNP bipolar transistor Qp2, and resistors Rh1. Rh2, Rp1, Rp2, Rn1, and Rn2. Each of the first PNP bipolar transistor Qp1 and the second PNP bipolar transistor Qp2 may be an asymmetric bipolar transistor. Each of the resistors Rh1, Rh2, Rp1, Rp2, Rn1, and Rn2 may include a well resistor as described above with reference to FIG. 2.

The clamp circuit 110b may include a first forward diode Df1 and a second forward diode Df2. In some embodiments, as described below with reference to FIG. 12B, the first forward diode Df1 may include a separate n-well and p+ region, whereas the second forward diode Df2 may include an n-well and a p+ region of the symmetric NPN bipolar transistor Qnpn. In addition, the clamp circuit 110b may include a first reverse diode Dr1 and a second reverse diode Dr2. In some embodiments, as described below with reference to FIG. 12B, the first reverse diode Dr1 may include a separate n-well and p+ region, whereas the second reverse diode Dr2 may include an n-well and a p+ region of the symmetric NPN bipolar transistor Qnpn.

Figure 12A:
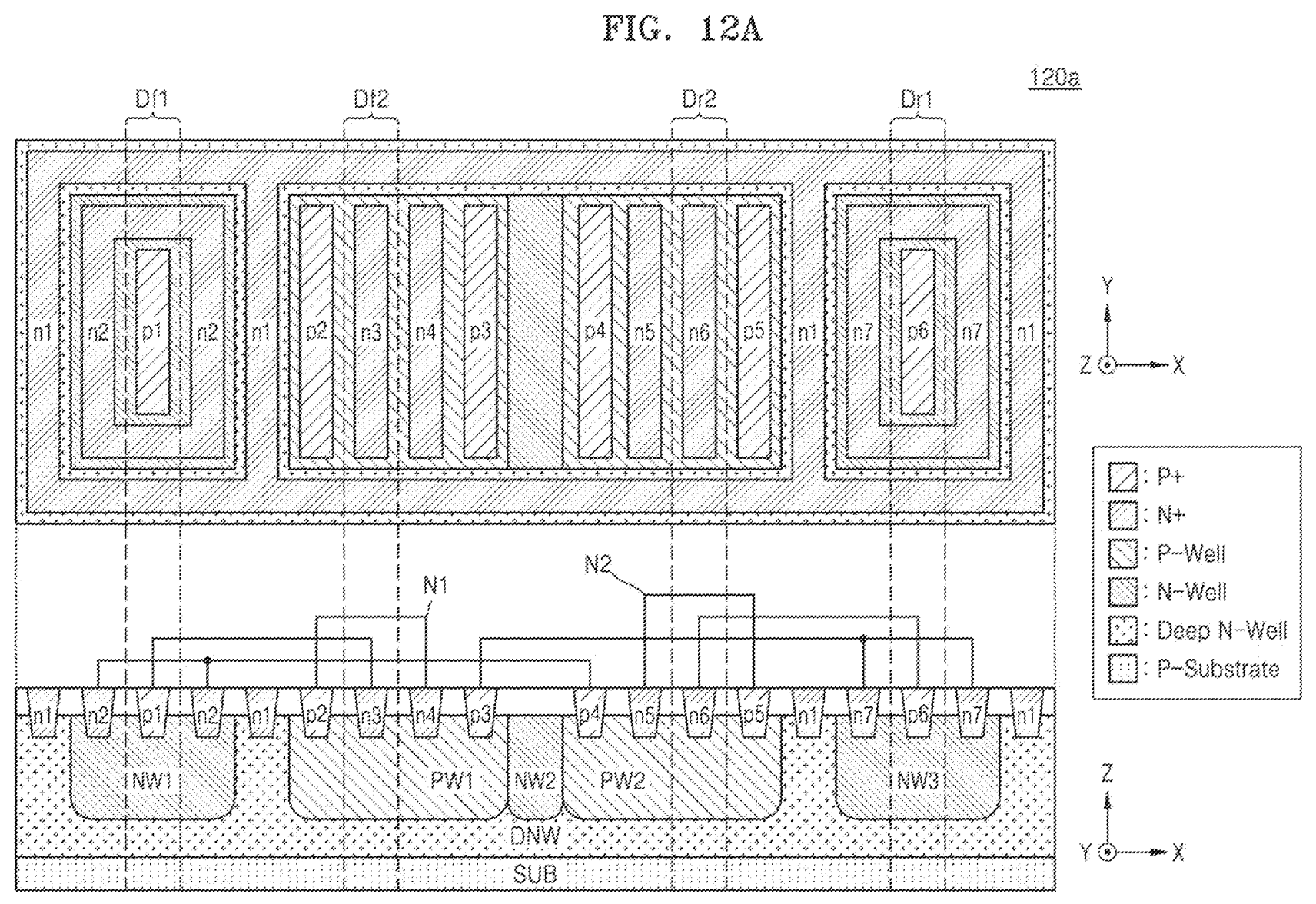
Figure 12B:
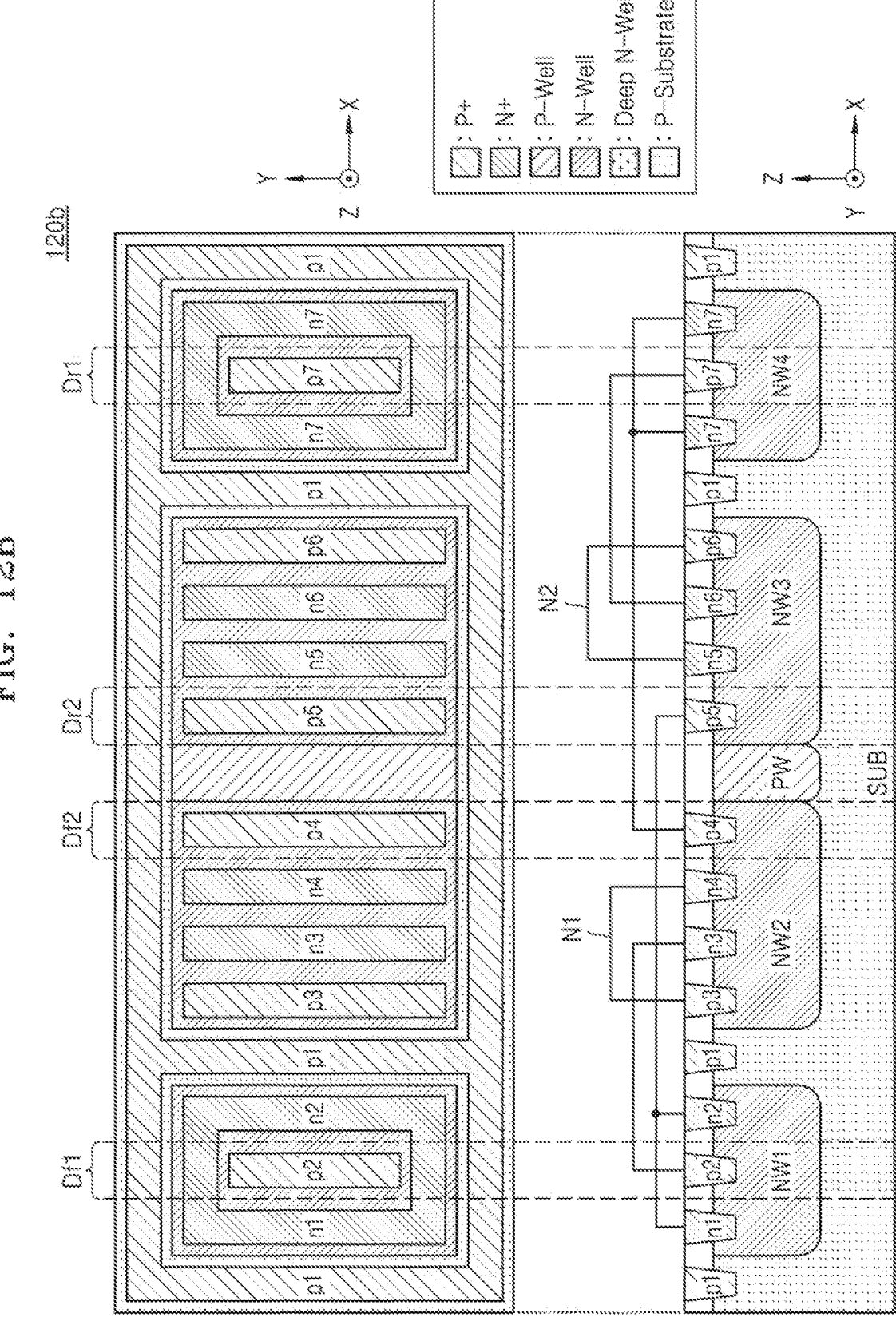

FIGS. 12A and 12B are diagrams illustrating examples of a layout of a clamp circuit according to some embodiments. For example, FIG. 12A shows a plan view and a cross-sectional view of a layout 120a corresponding to the clamp circuit 110a of FIG. 11A, and FIG. 12B shows plan view of a cross-sectional view of a layout 120b corresponding to the clamp circuit 110b of FIG. 11B. In FIGS. 12A and 12B, contacts and patterns for connecting n+ regions and gates with each other may be omitted for convenience in illustration. The clamp circuits 110a and 110b of FIGS. 11A and 11B are not limited to the layouts 120a and 120b of FIGS. 12A and 12B. Hereinafter, FIGS. 12A and 12B are described with reference to FIGS. 11A and 11B.

With reference to FIG. 12A, a deep n-well DNW may be disposed in a substrate SUB including p-type impurities. In the deep n-well DNW, a first p-well PW1, a second n-well NW2, and a second p-well PW2 may be disposed sequentially, and the second n-well NW2 may abut each of the first p-well PW1 and the second p-well PW2. In addition, in the deep n-well DNW, the first n-well NW1 may be apart from the first p-well PW1, and the third n-well NW3 may be apart from the second p-well PW2. The first n+ region n1 may surround each of the first n-well NW1 and the third n-well NW3 on the deep n-well DNW, and surround the first p-well PW1, the second n-well NW2, and the second p-well PW2 which are disposed sequentially, and the positive supply voltage VDD may be applied thereto.

The second n+ region n2 and the first p+ region p1 may be disposed at the first n-well NW1. The second n+ region n2 may surround the first p+ region p1 on the first n-well NW1, and may be connected to the second p-well PW2, which may be a base of the second NPN bipolar transistor Qn2, through a fourth p+ region p4. The first p+ region p1 may be included in the first forward diode Df1 together with the first n-well NW1, and may be connected to the third n+ region n3, which may be a cathode of the second forward diode Df1.

The second p+ region p2, the third n+ region n3, the fourth n+ region n4, and the third p+ region p3 may be disposed at the first p-well PW1. The first p-well PW1 may be connected to the first node N1 through the second p+ region p2. The third n+ region n3 may be included in the second forward diode Df2 together with the first p-well PW1, and may be connected to the first p+ region p1, which may be an anode of the first forward diode Df1. The fourth n+ region n4 may be connected to the first node N1 and may correspond to an emitter of the first NPN bipolar transistor Qn1. The third p+ region p3 may be connected to the third n-well NW3, which may be a cathode of the reverse diode Dr, through a seventh n+ region n7.

The fourth p+ region p4, the fifth n+ region n5, the sixth n+ region n6, and the fifth p+ region p5 may be disposed at the second p-well PW2. The fourth p+ region p4 may be connected to the first n-well NW1, which may be a cathode of the first forward diode Df1, through the second n+ region n2. The fifth n+ region n5 may be connected to the second node N2 and may correspond to an emitter of the second NPN bipolar transistor Qn2. The sixth n+ region n6 may be included in the second reverse diode Dr2 together with the second p-well PW2 and may be connected to the sixth p+ region p6, which may be an anode of the first reverse diode Dr1. The second p-well PW2 may be connected to the second node N2 through the fifth p+ region p5.

The sixth p+ region p6 and a seventh n+ region n7 may be disposed at the third n-well NW3. The seventh n+ region n7 may surround the sixth p+ region p6 on the third n-well NW3, and may be connected to the first p-well PW1, which may be a base of the first NPN bipolar transistor Qn1, through the third p+ region p3. The sixth p+ region p6 may be included in the first reverse diode Dr1 together with the third n-well NW3, and may be connected to the sixth n+ region n6, which may be a cathode of the second reverse diode Dr2.

Figure 13A:
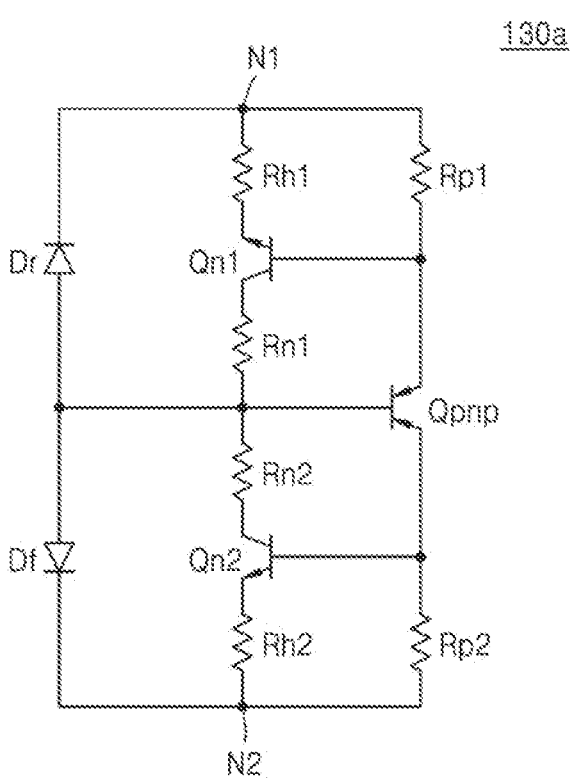
FIGS. 13A and 13B are circuit diagrams illustrating examples of a clamp circuit according to some embodiments.
Figure 13B:
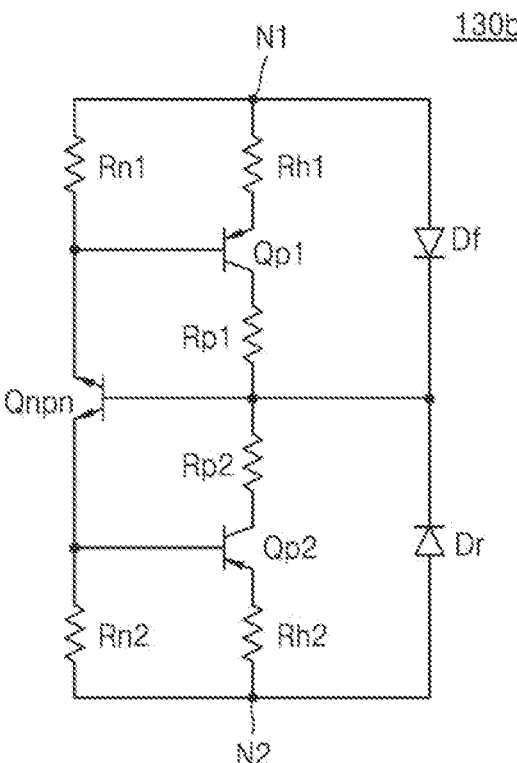

FIGS. 13A and 13B are circuit diagrams illustrating examples of a clamp circuit according to some embodiments. For example, the circuit diagram of FIG. 13A illustrates a clamp circuit 130a including a PNP bipolar transistor Qpnp as a symmetric bipolar transistor, and the circuit diagram of FIG. 13B illustrates a clamp circuit 130b including an NPN bipolar transistor Qnpn as a symmetric bipolar transistor. When compared to the clamp circuits 50a and 50b of FIGS. 5A and 5B, the clamp circuits 130a and 130b of FIGS. 13A and 13B may further include a forward diode Df and a reverse diode Dr. Hereinafter, redundant or duplicative description may be omitted in describing embodiments with reference to FIGS. 13A and 13B.

With reference to FIG. 13A, the clamp circuit 130a may include a symmetric PNP bipolar transistor Qpnp, a first NPN bipolar transistor Qn1, a second NPN bipolar transistor Qn2, and resistors Rh1. Rh2, Rp1, Rp2, Rn1, and Rn2. Each of the first NPN bipolar transistor Qn1 and the second NPN bipolar transistor Qn2 may be an asymmetric bipolar transistor. Each of the resistors Rh1, Rh2, Rp1, Rp2, Rn1, and Rn2 may include a well resistor as described above with reference to FIG. 2.

The clamp circuit 130a may further include the forward diode Df and the reverse diode Dr. The forward diode Df and the reverse diode Dr may function as a trigger circuit and may lower a trigger voltage of the clamp circuit 130a. For example, when a forward voltage occurs, a trigger current may flow through the resistor Rp1, the symmetric PNP bipolar transistor Qpnp, and the forward diode Df, and then the current may flow through the resistor Rp1, the symmetric PNP bipolar transistor Qpnp, and the second NPN bipolar transistor Qn2. When a reverse voltage occurs, a trigger current may flow through the resistor Rp2, the symmetric PNP bipolar transistor Qpnp, and the reverse diode Dr, and then the current may flow through the resistor Rp2, the symmetric PNP bipolar transistor Qpnp, and the first NPN bipolar transistor Qn1.

With reference to FIG. 13B, the clamp circuit 130b may include a symmetric NPN bipolar transistor Qnpn, a first PNP bipolar transistor Qp1, a second PNP bipolar transistor Qp2, and resistors Rh1. Rh2, Rp1, Rp2, Rn1, and Rn2. Each of the first PNP bipolar transistor Qp1 and the second PNP bipolar transistor Qp2 may be an asymmetric bipolar transistor. Each of the resistors Rh1, Rh2, Rp1, Rp2, Rn1, and Rn2 may include a well resistor as described above with reference to FIG. 2.

The clamp circuit 130b may further include the forward diode Df and the reverse diode Dr. The forward diode Df and the reverse diode Dr may function as a trigger circuit and may lower a trigger voltage of the clamp circuit 130b. For example, when a forward voltage occurs, a trigger current may flow through the forward diode Df, the first PNP bipolar transistor Qp1, and the resistor Rn2, and then the current may flow through the resistor Rh1, the first PNP bipolar transistor Qp1, the symmetric NPN bipolar transistor Qnpn, and the resistor Rn2. When a reverse voltage occurs, a trigger current may flow through the reverse diode Dr, the second PNP bipolar transistor Qp2, and the resistor Rn1, and then the current may flow through the resistor Rh2, the second PNP bipolar transistor Qp2, the symmetric NPN bipolar transistor Qnpn, and the resistor Rn1.

Figure 14A:
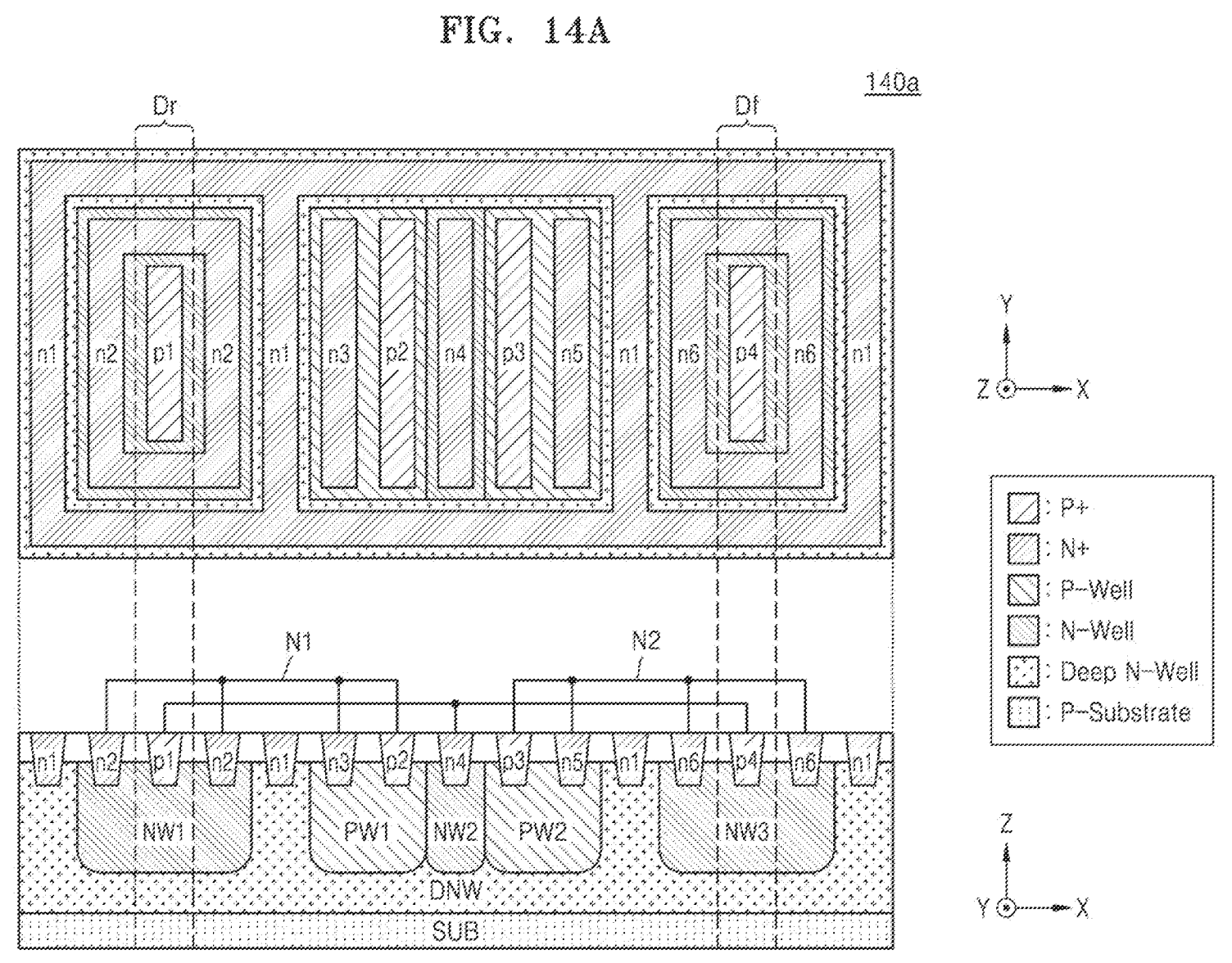
Figure 14B:
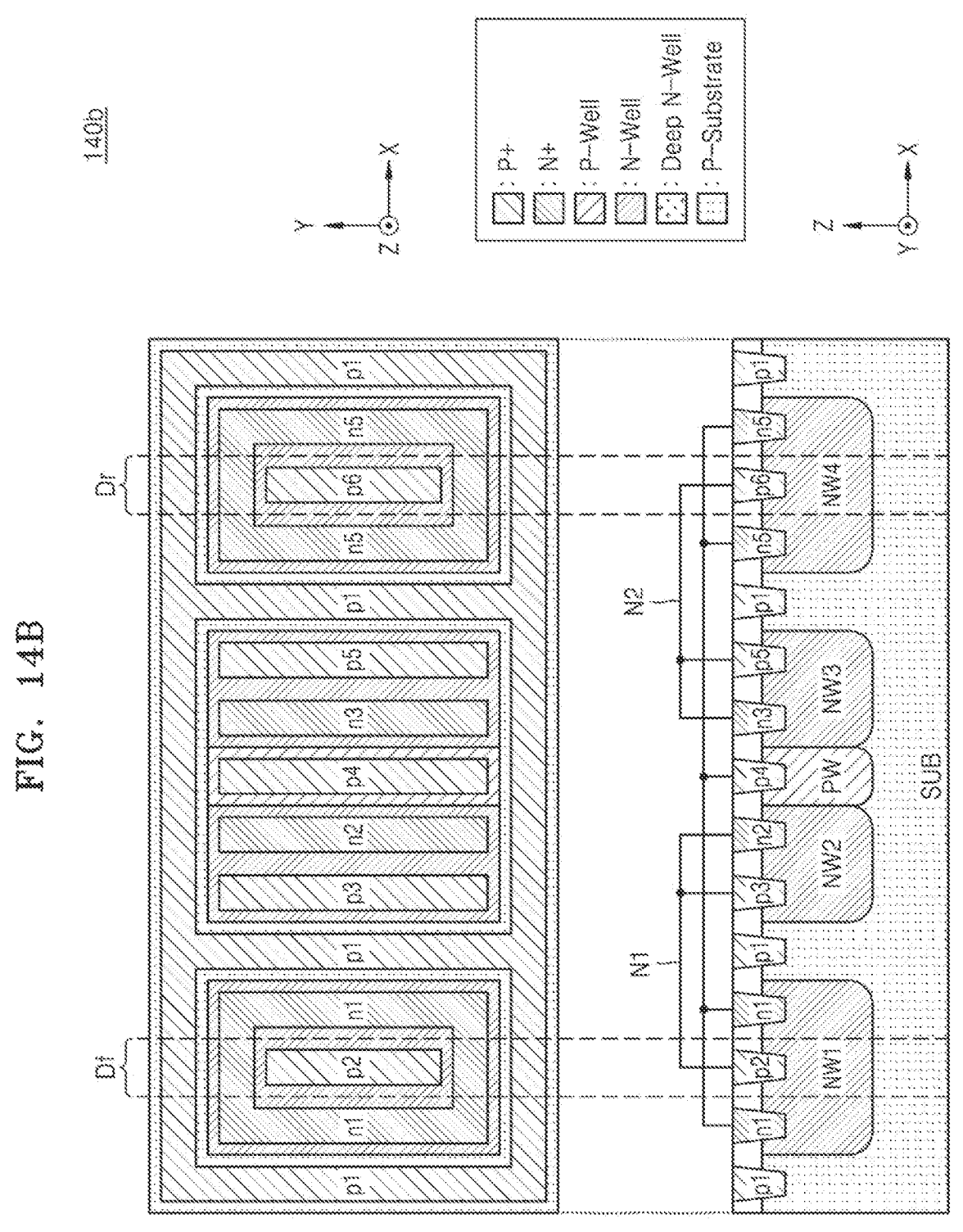

FIGS. 14A and 14B are diagrams illustrating examples of a layout of a clamp circuit according to some embodiments. For example, FIG. 14A shows a plan view and a cross-sectional view of a layout 140a corresponding to the clamp circuit 130a of FIG. 13A, and FIG. 14B shows plan view of a cross-sectional view of a layout 140b corresponding to the clamp circuit 130b of FIG. 13B. In FIGS. 14A and 14B, contacts and patterns for connecting p+ regions, n+ regions and gates with each other may be omitted for convenience in illustration. The clamp circuits 130a and 130b of FIGS. 13A and 13B are not limited to the layouts 140a and 140b of FIGS. 14A and 14B. Hereinafter, FIGS. 14A and 14B are described with reference to FIGS. 13A and 13B.

With reference to FIG. 14A, a deep n-well DNW may be disposed in a substrate SUB including p-type impurities. In the deep n-well DNW, a first p-well PW1, a second n-well NW2, and a second p-well PW2 may be disposed sequentially, and the second n-well NW2 may abut each of the first p-well PW1 and the second p-well PW2. In addition, in the deep n-well DNW, the first n-well NW1 may be apart from the first p-well PW1, and the third n-well NW3 may be apart from the second p-well PW2. The first n+ region n1 may surround each of the first n-well NW1 and the third n-well NW3 on the deep n-well DNW, and surround the first p-well PW1, the second n-well NW2, and the second p-well PW2 which are disposed sequentially, and the positive supply voltage VDD may be applied thereto.

The second n+ region n2 and the first p+ region p1 may be disposed at the first n-well NW1. The second n+ region n2 may surround the first p+ region p1 on the first n-well NW1 and may be connected to the first node N1. The first p+ region p1 may be included in the reverse diode Dr together with the first n-well NW1, and may be connected to the second n-well NW2, which may be a base of the symmetric PNP bipolar transistor Qpnp through the fourth n+ region n4.

The third n+ region n3 and the second p+ region p2 may be disposed at the first p-well PW1. The third n+ region n3 may be connected to the first node N1 and may correspond to an emitter of the first NPN bipolar transistor Qn1. The first p-well PW1 may be connected to the first node N1 through the second p+ region p2. The fourth n+ region n4 may be disposed at the second n-well NW2. The fourth n+ region n4 may be connected to the first p+ region p1, which may be an anode of the reverse diode Dr, and may be connected to the fourth p+ region p4, which may be an anode of the forward diode Df. The third p+ region p3 and the fifth n+ region n5 may be disposed at the second p-well PW2. The second p-well PW2 may be connected to the second node N2 through the third p+ region p3. The fifth n+ region n5 may be connected to the second node N2 and may correspond to an emitter of the second NPN bipolar transistor Qn2.

The sixth n+ region n6 and the fourth p+ region p4 may be disposed at the third n-well NW3. The sixth n+ region n6 may surround the fourth p+ region p4 on the third n-well NW3, and may be connected to the second node N2. The fourth p+ region p4 may be included in the forward diode Df together with the third n-well NW3 and may be connected to the second n-well NW2, which may be a base of the symmetric PNP bipolar transistor Qpnp, through the fourth n+ region n4.

With reference to FIG. 14B, the second n-well NW2, the p-well PW, and the third n-well NW3 may be sequentially disposed in the substrate SUB including p-type impurities, and the p-well PW may abut each of the second n-well NW2 and the third n-well NW3. In the substrate SUB, the first n-well NW1 may be apart from the second n-well NW2, and the fourth n-well NW4 may be apart from the third n-well NW3. The first p+ region p1 may surround each of the first n-well NW1 and the fourth n-well NW4 on the substrate SUB, and surround the second n-well NW2, the p-well PW, and the third n-well NW3, which are disposed sequentially, and the negative supply voltage VSS may be applied thereto.

The first n+ region n1 and the second p+ region p2 may be disposed at the first n-well NW1. The first n+ region n1 may surround the second p+ region p2 on the first n-well NW1 and may be connected to the p-well PW, which may be a base of the symmetric NPN bipolar transistor Qnpn, through the fourth p+ region p4. The second p+ region p2 may be included in the forward diode Df together with the first n-well NW1 and may be connected to the first node N1.

The third p+ region p3 and the second n+ region n2 may be disposed at the second n-well NW2. The third p+ region p3 may be connected to the first node N1 and may correspond to an emitter of the first PNP bipolar transistor Qp1. The second n-well NW2 may be connected to the first node N1 through the second n+ region n2. The fourth p+ region p4 may be disposed at the p-well PW. The fourth p+ region p4 may be connected to the second p+ region p2, which may be an anode of the forward diode Df, and may be connected to the sixth p+ region p6, which may be an anode of the reverse diode Dr. The third n+ region n3 and the fifth p+ region p5 may be disposed at the third n-well NW3. The third n-well NW3 may be connected to the second node N2 through the third n+ region n3. The fifth p+ region p5 may be connected to the second node N2, and may correspond to an emitter of the second PNP bipolar transistor Qp2.

The fifth n+ region n5 and the sixth p+ region p6 may be disposed at the fourth n-well NW4. The fifth n+ region n5 may surround the sixth p+ region p6 on the fourth n-well NW4, and may be connected to the fourth p+ region p4, which may be a base of the symmetric NPN bipolar transistor Qnpn. The sixth p+ region p6 may be included in the reverse diode Dr together with the fourth n-well NW4 and may be connected to the second node N2.

Figure 15A:
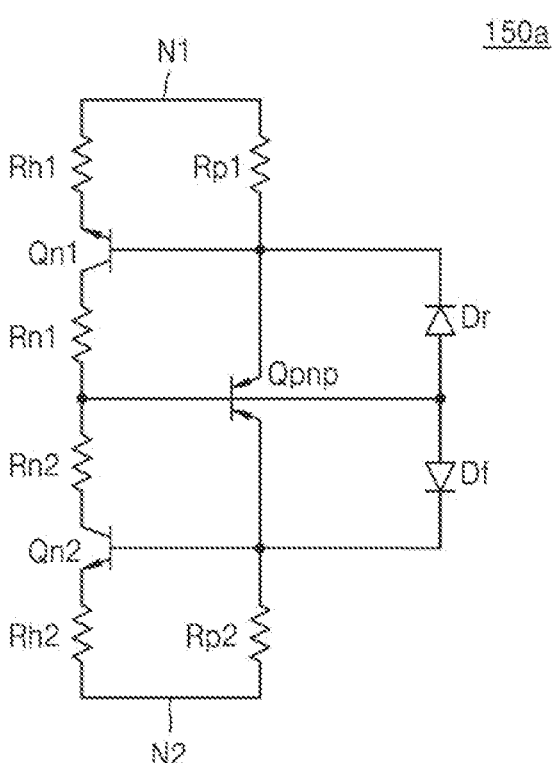
FIGS. 15A and 15B are circuit diagrams illustrating examples of a clamp circuit according to some embodiments.
Figure 15B:
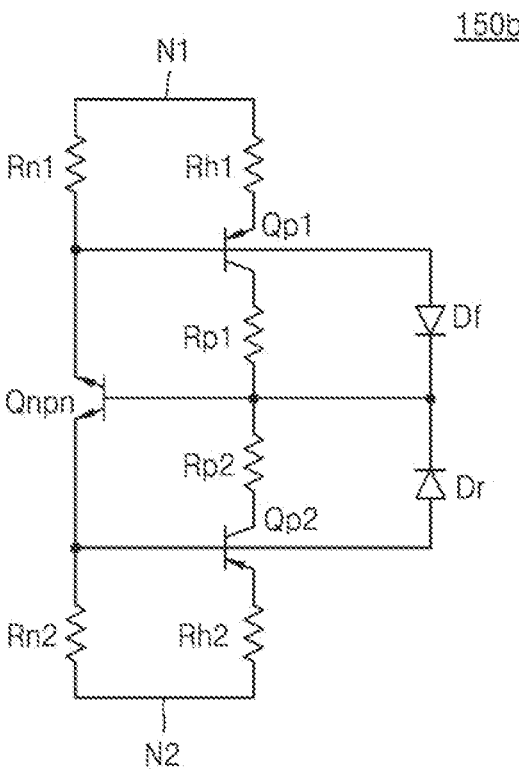

FIGS. 15A and 15B are circuit diagrams illustrating examples of a clamp circuit according to some embodiments. For example, the circuit diagram of FIG. 15A illustrates a clamp circuit 150a including a PNP bipolar transistor Qpnp as a symmetric bipolar transistor, and the circuit diagram of FIG. 15B illustrates a clamp circuit 150b including an NPN bipolar transistor Qnpn as a symmetric bipolar transistor. When compared to the clamp circuits 50a and 50b of FIGS. 5A and 5B, the clamp circuits 150a and 150b of FIGS. 15A and 15B may further include a forward diode Df and a reverse diode Dr. Hereinafter, redundant or duplicative description may be omitted in describing embodiments with reference to FIGS. 15A and 15B.

With reference to FIG. 15A, the clamp circuit 150a may include a symmetric PNP bipolar transistor Qpnp, a first NPN bipolar transistor Qn1, a second NPN bipolar transistor Qn2, and resistors Rh1, Rh2, Rp1, Rp2, Rn1, and Rn2. Each of the first NPN bipolar transistor Qn1 and the second NPN bipolar transistor Qn2 may be an asymmetric bipolar transistor. Each of the resistors Rh1, Rh2, Rp1, Rp2, Rn1, and Rn2 may include a well resistor as described above with reference to FIG. 2.

The clamp circuit 150a may further include the forward diode Df and the reverse diode Dr. The forward diode Df and the reverse diode Dr may function as a trigger circuit and may lower a trigger voltage of the clamp circuit 150a. For example, when a forward voltage occurs, a trigger current may flow through the resistor Rp1, the symmetric PNP bipolar transistor Qpnp, the forward diode Df, and the second NPN bipolar transistor Qn2, and then the current may flow through the resistor Rp1, the symmetric PNP bipolar transistor Qpnp, and the second NPN bipolar transistor Qn2. When a reverse voltage occurs, a trigger current may flow through the resistor Rp2, the symmetric PNP bipolar transistor Qpnp, the reverse diode Dr, and the first NPN bipolar transistor Qn1, and then the current may flow through the resistor Rp2, the symmetric PNP bipolar transistor Qpnp, and the first NPN bipolar transistor Qn1.

With reference to FIG. 15B, the clamp circuit 150b may include a symmetric NPN bipolar transistor Qnpn, a first PNP bipolar transistor Qp1, a second PNP bipolar transistor Qp2, and resistors Rh1, Rh2, Rp1, Rp2, Rn1, and Rn2. Each of the first PNP bipolar transistor Qp1 and the second PNP bipolar transistor Qp2 may be an asymmetric bipolar transistor. Each of the resistors Rh1, Rh2, Rp1, Rp2, Rn1, and Rn2 may include a well resistor as described above with reference to FIG. 2.

The clamp circuit 150b may further include the forward diode Df and the reverse diode Dr. The forward diode Df and the reverse diode Dr may function as a trigger circuit and may lower a trigger voltage of the clamp circuit 150b. For example, when a forward voltage occurs, a trigger current may flow through the resistor Rh1, the first PNP bipolar transistor Qp1, the forward diode Df, the symmetric NPN bipolar transistor Qnpn, and the resistor Rn2, and then the current may flow through the resistor Rh1, the first PNP bipolar transistor Qp1, the symmetric NPN bipolar transistor Qnpn, and the resistor Rn2. When a reverse voltage occurs, a trigger current may flow through the resistor Rh2, the second PNP bipolar transistor Qp2, the reverse diode Dr, the symmetric NPN bipolar transistor Qnpn, and the resistor Rn1, and then the current may flow through the resistor Rh2, the second PNP bipolar transistor Qp2, the symmetric NPN bipolar transistor Qnpn, and the resistor Rn1.

Figure 16A:
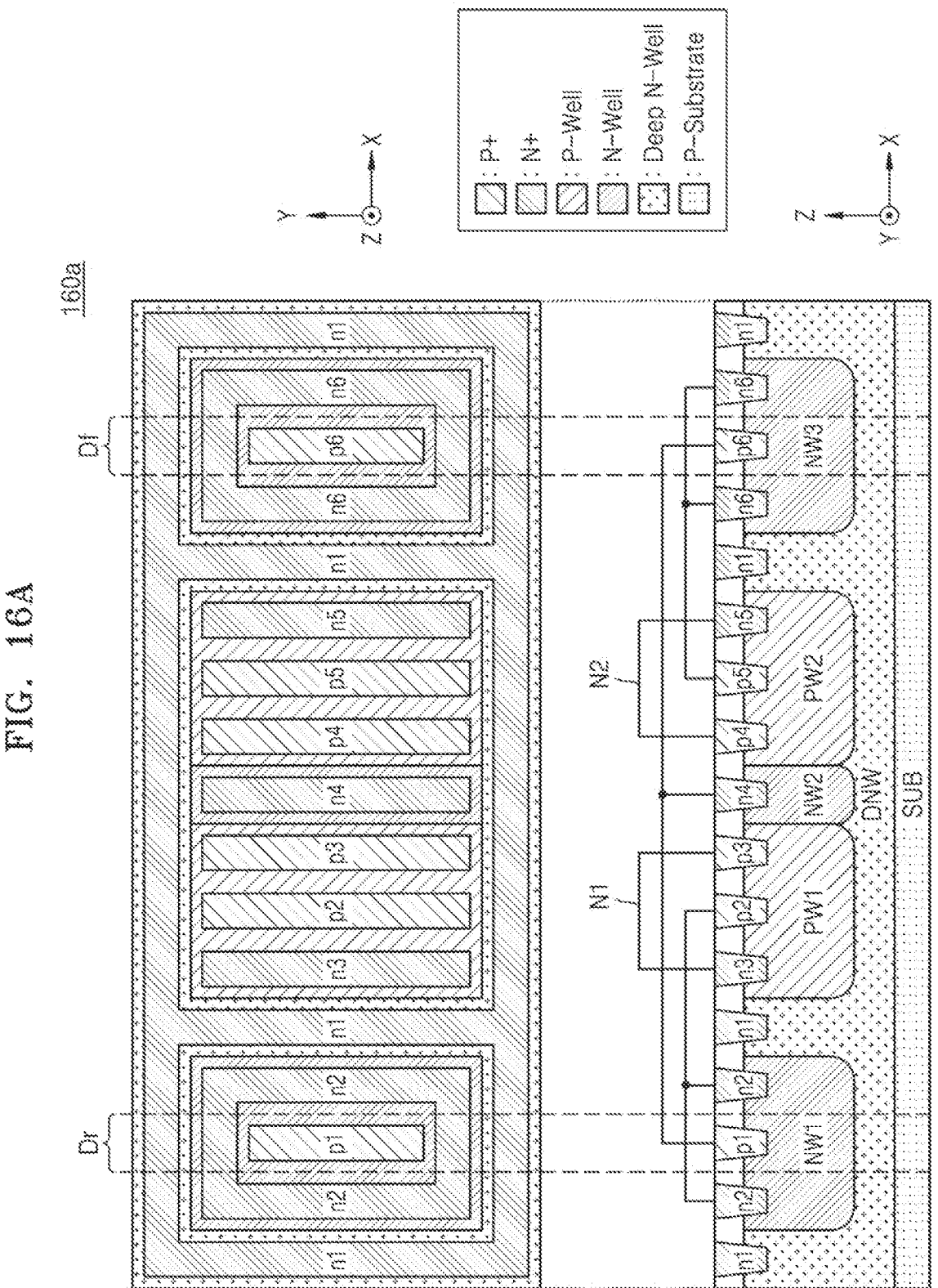
FIGS. 16A and 16B are diagrams illustrating examples of a layout of a clamp circuit according to some embodiments.
Figure 16B:
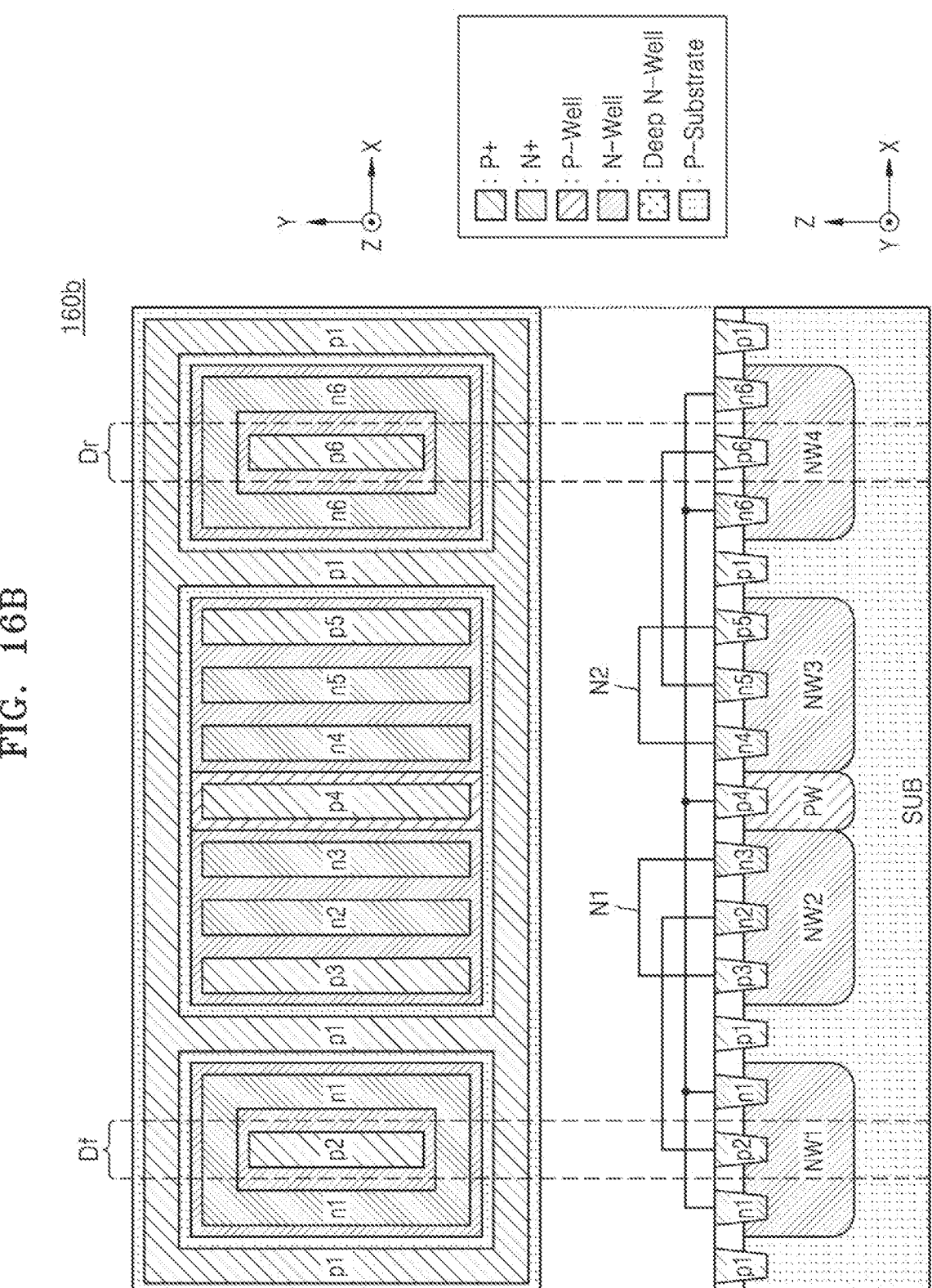

FIGS. 16A and 16B are diagrams illustrating examples of a layout of a clamp circuit according to some embodiments. For example, FIG. 16A shows a plan view and a cross-sectional view of a layout 160a corresponding to the clamp circuit 150a of FIG. 15A, and FIG. 16B shows plan view of a cross-sectional view of a layout 160b corresponding to the clamp circuit 150b of FIG. 15B. In FIGS. 16A and 16B, contacts and patterns for connecting n+ regions and gates with each other may be omitted for convenience in illustration. The clamp circuits 150a and 150b of FIGS. 15A and 15B are not limited to the layouts 160a and 160b of FIGS. 16A and 16B. Hereinafter, FIGS. 16A and 16B are described with reference to FIGS. 15A and 15B.

With reference to FIG. 16A, a deep n-well DNW may be disposed in a substrate SUB including p-type impurities. In the deep n-well DNW, a first p-well PW1, a second n-well NW2, and a second p-well PW2 may be disposed sequentially, and the second n-well NW2 may abut each of the first p-well PW1 and the second p-well PW2. In addition, in the deep n-well DNW, the first n-well NW1 may be apart from the first p-well PW1, and the third n-well NW3 may be apart from the second p-well PW2. The first n+ region n1 may surround each of the first n-well NW1 and the third n-well NW3 on the deep n-well DNW, and surround the first p-well PW1, the second n-well NW2, and the second p-well PW2 which are disposed sequentially, and the positive supply voltage VDD may be applied thereto.

The second n+ region n2 and the first p+ region p1 may be disposed at the first n-well NW1. The second n+ region n2 may surround the first p+ region p1 on the first n-well NW1, and may be connected to the first p-well PW1, which may be a base of the first NPN bipolar transistor Qn1, through the second p+ region p2. The first p+ region p1 may be connected to the second n-well NW2, which may be a base of the symmetric PNP bipolar transistor Qpnp, through the fourth n+ region n4.

The third n+ region n3, the second p+ region p2, and the third p+ region p3 may be disposed at the first p-well PW1. The third n+ region n3 may be connected to the first node N1 and may correspond to an emitter of the first NPN bipolar transistor Qn1. The second p+ region p2 may be connected to the first n-well NW1, which may be a cathode of the reverse diode Dr, through the second n+ region n2. The first p-well PW1 may be connected to the first node N1 through the third p+ region p3. The fourth n+ region n4 may be disposed at the second n-well NW2. The fourth n+ region n4 may be connected to the first p+ region p1, which may be an anode of the reverse diode Dr, and may be connected to the sixth p+ region p6, which may be an anode of the forward diode Df. The fourth p+ region p4, the fifth p+ region p5, and the fifth n+ region n5 may be disposed at the second p-well PW2. The second p-well PW2 may be connected to the second node N2 through the fourth p+ region p4. The fifth n+ region n5 may be connected to the second node N2 and may correspond to an emitter of the second NPN bipolar transistor Qn2.

The sixth n+ region n6 and the sixth p+ region p6 may be disposed at the third n-well NW3. The sixth n+ region n6 may surround the sixth p+ region p6 on the third n-well NW3 and may be connected to the second p-well PW2, which may be a base of the second NPN bipolar transistor Qn2, through the fifth p+ region p5. The sixth p+ region p6 may be connected to the second n-well NW2, which may be a base of the symmetric PNP bipolar transistor Qpnp, through the fourth n+ region n4.

With reference to FIG. 16B, the second n-well NW2, the p-well PW, and the third n-well NW3 may be sequentially disposed in the substrate SUB including p-type impurities, and the p-well PW may abut each of the second n-well NW2 and the third n-well NW3. In the substrate SUB, the first n-well NW1 may be apart from the second n-well NW2, and the fourth n-well NW4 may be apart from the third n-well NW3. The first p+ region p1 may surround each of the first n-well NW1 and the fourth n-well NW4 on the substrate SUB, and surround the second n-well NW2, the p-well PW, and the third n-well NW3, which are disposed sequentially, and the negative supply voltage VSS may be applied thereto.

The first n+ region n1 and the second p+ region p2 may be disposed at the first n-well NW1. The first n+ region n1 may surround the second p+ region p2 on the first n-well NW1 and may be connected to the p-well PW, which may be a base of the symmetric NPN bipolar transistor Qnpn, through the fourth p+ region p4. The second p+ region p2 may be included in the forward diode Df together with the first n-well NW1 and may be connected to the second n-well NW2, which may be a base of the first PNP bipolar transistor Qp1, through the second n+ region n2.

The third p+ region p3, the second n+ region n2, and the third n+ region n3 may be disposed at the second n-well NW2. The third p+ region p3 may be connected to the first node N1 and may correspond to an emitter of the first PNP bipolar transistor Qp1. The second n+ region n2 may be connected to the second p+ region p2, which may be an anode of the forward diode Df. The second n-well NW2 may be connected to the first node N1 through the third n+ region n3. The fourth p+ region p4 may be disposed at the p-well PW. The fourth p+ region p4 may be connected to the second p+ region p2, which may be an anode of the forward diode Df, and may be connected to the sixth p+ region p6, which may be an anode of the reverse diode Dr. The fourth n+ region n4, the fifth n+ region n5, and the fifth p+ region p5 may be disposed at the third n-well NW3. The third n-well NW3 may be connected to the second node N2 through the fourth n+ region n4. The fifth n+ region n5 may be connected to the sixth p+ region p6, which may be an anode of the reverse diode Dr. The fifth p+ region p5 may be connected to the second node N2, and may correspond to an emitter of the second PNP bipolar transistor Qp2.

The sixth n+ region n6 and the sixth p+ region p6 may be disposed at the fourth n-well NW4. The sixth n+ region n6 may surround the sixth p+ region p6 on the fourth n-well NW4, and may be connected to the fourth p+ region p4, which may be a base of the symmetric NPN bipolar transistor Qnpn. The sixth p+ region p6 may be included in the reverse diode Dr together with the fourth n-well NW4, and may be connected to the third n-well NW3, which may be a base of the second PNP bipolar transistor Qp2, through the fifth n+ region n5.

Figure 17:
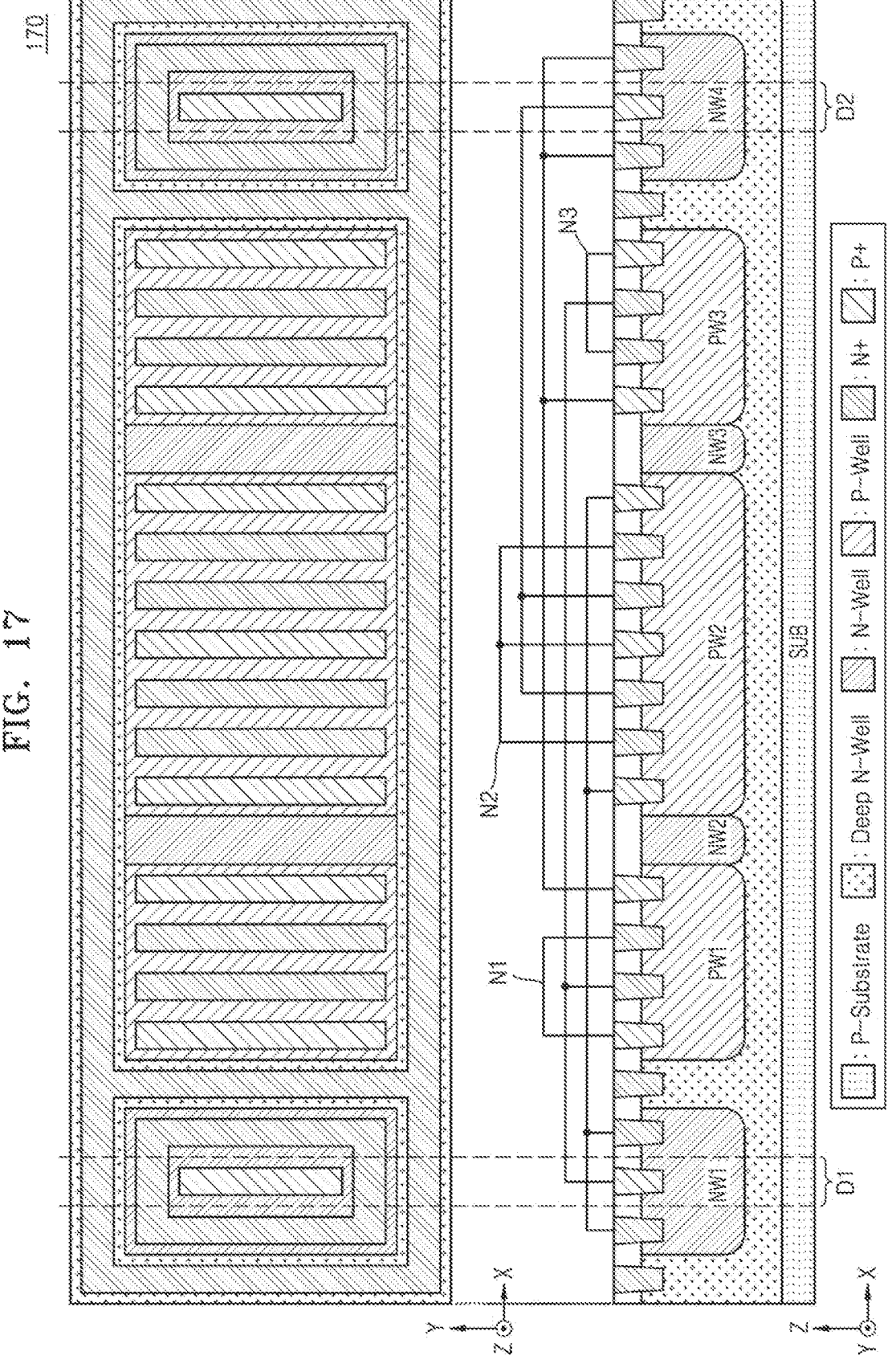
FIG. 17 is a diagram of a layout of a clamp circuit according to an embodiment.

FIG. 17 is a diagram of a layout of a clamp circuit according to an embodiment. For example. FIG. 17 illustrates a layout corresponding to the clamp circuit 110a of FIG. 11A. For example, a first clamp circuit may be connected between the first node N1 and the second node N2, and a second clamp circuit may be connected between the second node N2 and a third node N3. In some embodiments, the first clamp circuit may correspond to the first IO clamp 12, and the second clamp circuit may correspond to the second IO clamp 13 of FIG. 1. In FIG. 17, contacts and patterns for connecting n+ regions and gates with each other may be omitted for convenience in illustration. Similar to FIG. 17, it is understood that the clamp circuits described above with reference to the drawings may have an overlapping structure, for example, a well-sharing structure. Hereinafter. FIG. 17 is described with reference to FIG. 11A, and redundant or duplicative description may be omitted.

With reference to FIG. 17, a deep n-well DNW may be disposed in a substrate SUB including p-type impurities. In the deep n-well DNW, the first p-well PW1, the second n-well NW2, the second p-well PW2, the third n-well NW3, and the third p-well PW3 may be sequentially disposed, and abut each other. In addition, in the deep n-well DNW, the first n-well NW1 may be apart from the first p-well PW1, and the fourth n-well NW4 may be apart from the third p-well PW3.

A symmetric PNP bipolar transistor of the first clamp circuit and a symmetric PNP bipolar transistor of the second clamp circuit may share the second p-well PW2. For example, as illustrated in FIG. 17, the first p-well PW1, the second n-well NW2, and the second p-well PW2 may be included in the symmetric PNP bipolar transistor of the first clamp circuit, and the third p-well PW3, the third n-well NW3, and the second p-well PW2 may be included in the symmetric PNP bipolar transistor of the second clamp circuit. The second p-well PW2 shared by the symmetric PNP bipolar transistor of the first clamp circuit and the symmetric PNP bipolar transistor of the second clamp circuit may be connected to the second node N2 through a p+ region. As the second p-well PW2 is shared, a layout 170 may have a reduced region.

The first diode D1 including the first n-well NW1 and the p+ region disposed in the first n-well NW1 may correspond to the first forward diode Df1 of the first clamp circuit and the first reverse diode Dr1 of the second clamp circuit. In addition, the second diode D2 including the fourth n-well NW4 and the p+ region disposed in the fourth n-well NW4 may correspond to the first reverse diode Dr1 of the first clamp circuit and the first forward diode Df1 of the second clamp circuit.

While the embodiments have been particularly shown and described above, it will be understood that various changes in form and details may be made therein without departing from the spirit and scope of the following claims.

What is claimed is:

1. A device comprising a first clamp circuit connected between a first node and a second node,
   wherein the first clamp circuit comprises:
   a symmetric bipolar transistor comprising a control terminal, a first current terminal and a second current terminal, wherein the first current terminal and the second current terminal are symmetrical to each other with respect to the control terminal;
   a first bipolar transistor electrically connected to the symmetric bipolar transistor and to the first node;
   a second bipolar transistor electrically connected to the symmetric bipolar transistor and to the second node;
   at least one first diode forwardly connected from the control terminal to at least one of the first node and the first current terminal; and
   at least one second diode forwardly connected from the control terminal to at least one of the second node and the second current terminal.

2. The device of claim 1, wherein the first bipolar transistor comprises a first collector electrically connected to the control terminal, a first base electrically connected to the first current terminal, and a first emitter electrically connected to the first node, and
   wherein the second bipolar transistor comprises a second collector electrically connected to the control terminal, a second base electrically connected to the second current terminal, and a second emitter electrically connected to the second node.

3. The device of claim 2, wherein the first current terminal corresponds to a first p-well, the control terminal corresponds to a first n-well, and the second current terminal corresponds to a second p-well,
   wherein the first p-well, the first n-well, and the second p-well are sequentially disposed, and
   wherein each of the first bipolar transistor and the second bipolar transistor is an NPN bipolar transistor.

4. The device of claim 3, wherein the first collector corresponds to the first n-well, the first base corresponds to the first p-well, and the first emitter corresponds to an n+ region disposed in the first p-well, and
   wherein the second collector corresponds to the first n-well, the second base corresponds to the second p-well, and the second emitter corresponds to an n+ region disposed in the second p-well.

5. The device of claim 3, wherein the first p-well, the first n-well, and the second p-well are disposed in a deep n-well which is disposed in a substrate.

6. The device of claim 2, wherein the first current terminal corresponds to a first n-well, the control terminal corresponds to a p-well, and the second current terminal corresponds to a second n-well,
   wherein the first n-well, the p-well, and the second n-well are sequentially disposed, and
   wherein each of the first bipolar transistor and the second bipolar transistor is a PNP bipolar transistor.

7. The device of claim 6, wherein the first collector corresponds to the p-well, the first base corresponds to the first n-well, and the first emitter corresponds to a p+ region disposed in the first n-well, and wherein the second collector corresponds to the p-well, the second base corresponds to the second n-well, and the second emitter corresponds to a p+ region disposed in the second n-well.

8. The device of claim 1, further comprising:
   a second clamp circuit connected between the second node and a third node, and having a same structure as the first clamp circuit; and
   an input/output pad electrically connected to the second node,
   wherein the first node is connected to a positive supply voltage node,
   wherein the third node is connected to a negative supply voltage node, and
   wherein the symmetric bipolar transistor of the first clamp circuit shares a well with a symmetric bipolar transistor of the second clamp circuit.

9. A device comprising a first clamp circuit connected between a first node and a second node,
   wherein the first clamp circuit comprises:
   a symmetric bipolar transistor comprising a control terminal, a first current terminal and a second current terminal, wherein the first current terminal and the second current terminal are symmetrical to each other with respect to the control terminal;
   a first bipolar transistor electrically connected to the symmetric bipolar transistor and to the first node; and
   a second bipolar transistor electrically connected to the symmetric bipolar transistor and to the second node,
   wherein the first current terminal corresponds to a first n-well, the control terminal corresponds to a p-well, and the second current terminal corresponds to a second n-well,
   wherein the first n-well, the p-well, and the second n-well are sequentially disposed, and
   wherein each of the first bipolar transistor and the second bipolar transistor is a PNP bipolar transistor,
   wherein the first clamp circuit further comprises:
   at least one first diode forwardly connected from the first current terminal to the second node; and
   at least one second diode forwardly connected from the second current terminal to the first node,
   wherein the at least one first diode comprises a first-first diode,
   wherein a cathode of the first-first diode corresponds to a third n-well disposed apart from the first n-well, and an anode of the first-first diode corresponds to a p+ region disposed in the third n-well,
   wherein the at least one second diode comprises a first-second diode, wherein a cathode of the first-second diode corresponds to a fourth n-well disposed apart from the second n-well, and an anode of the first-second diode corresponds to a p+ region disposed in the fourth n-well,
   wherein the at least one first diode further comprises a second-first diode, wherein a cathode of the second-first diode corresponds to the first n-well, and an anode of the second-first diode corresponds to a p+ region disposed in the first n-well, and
   wherein the at least one second diode further comprises a second-second diode, wherein a cathode of the second-second diode corresponds to the second n-well, and an anode of the second-second diode corresponds to a p+ region disposed in the second n-well.

10. A device comprising a first clamp circuit connected between a first node and a second node, wherein the first clamp circuit comprises:

a symmetric NPN bipolar transistor comprising a control terminal, a first current terminal and a second current terminal, wherein the first current terminal and the second current terminal are symmetrical to each other with respect to the control terminal;

a first PNP bipolar transistor comprising a first collector electrically connected to the control terminal, a first base electrically connected to the first current terminal, and a first emitter electrically connected to the first node;

a second PNP bipolar transistor comprising a second collector electrically connected to the control terminal, a second base electrically connected to the second current terminal, and a second emitter electrically connected to the second node;

at least one first diode forwardly connected from at least one of the first node and the first current terminal to the control terminal; and at least one second diode forwardly connected from at least one of the second node and the second current terminal to the control terminal.

* * * * *